US012792181B2

(12) United States Patent
Coppoolse et al.

(10) Patent No.: US 12,792,181 B2
(45) Date of Patent: Nov. 10, 2026

(54) SHIFTING OF INTERNAL AND EXTERNAL SENSOR BLOCKS FOR IN-CELL DISPLAY PANELS

(71) Applicant: PARADE TECHNOLOGIES, LTD., San Jose, CA (US)

(72) Inventors: Roel Coppoolse, San Jose, CA (US); Gary Sterling, Shoreline, WA (US); Ian Kennedy, Glenville (IE); Timothy McCarthy, Bandon (IE)

(73) Assignee: PARADE TECHNOLOGIES, LTD., San Jos, CA (US)

( * ) Notice: Subject to any disclaimer, the term of this patent is extended or adjusted under 35 U.S.C. 154(b) by 0 days.

(21) Appl. No.: 19/236,876

(22) Filed: Jun. 12, 2025

(65) Prior Publication Data

US 2026/0252191 A1 Aug. 27, 2026

Related U.S. Application Data

(60) Provisional application No. 63/761,741, filed on Feb. 21, 2025.

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC ..... G06F 3/044; G06F 3/04166; G06F 3/0446
See application file for complete search history.

(56) References Cited

U.S. PATENT DOCUMENTS 7,825,905 B2 * 11/2010 Philipp .................. G06F 3/045 178/18.05
8,874,396 B1 * 10/2014 Olson ................ H03K 17/9622 345/173
9,489,097 B2 * 11/2016 Johansson ............. G06F 3/0446
12,307,040 B2 * 5/2025 Wu ..................... G02F 1/13458
12,471,807 B1 * 11/2025 Xiao .................... A61B 5/1172
2007/0229468 A1 * 10/2007 Peng .................. G06F 3/04847 345/173
2008/0278178 A1 * 11/2008 Philipp ................ G06F 3/0445 324/662
2010/0051433 A1 * 3/2010 Kong ...................... G06F 3/045 200/5 A (Continued)

*Primary Examiner* — Amy Onyekaba
(74) *Attorney, Agent, or Firm* — Morgan, Lewis & Bockius LLP

(57) ABSTRACT

This application is directed to shifting touch sensor blocks for detecting a touch event in a touch display. A touch display panel includes a capacitive sense array having touch sensors. The touch display obtains a plurality of capacitive sensing signals measured from the capacitive sense array, and the capacitive sense array includes a plurality of sensor blocks that further includes a first sensor block and a second sensor block immediately adjacent to the first sensor block. A touch event is detected at a touch location in the first sensor block based on the plurality of capacitive sensing signals. A touch region is determined based on the touch location, and includes a first set of touch sensors in the first sensor block and a second set of touch sensors in the second sensor block. The touch region is scanned to detect the touch event.

20 Claims, 12 Drawing Sheets

(56) References Cited

U.S. PATENT DOCUMENTS

2010/0053094 A1* 3/2010 Kong .................. G06F 3/04166
345/173
2010/0245286 A1* 9/2010 Parker ................. G06F 3/04883
345/174
2011/0157068 A1* 6/2011 Parker ................... G06F 3/0446
345/174
2012/0044194 A1* 2/2012 Peng ................... G06F 3/04847
345/174
2013/0100071 A1* 4/2013 Wright ................ G06F 3/04166
345/173
2013/0106716 A1* 5/2013 Sundara-Rajan ..... G06F 3/0443
345/173
2013/0215049 A1* 8/2013 Lee ......................... G06F 3/041
345/173
2015/0077375 A1* 3/2015 Hotelling ............. G09G 3/3648
345/173
2015/0309610 A1* 10/2015 Rabii ................ G06F 3/041662
345/174
2016/0162101 A1* 6/2016 Pant .................... G06F 3/04162
345/174
2016/0162102 A1* 6/2016 Shahparnia ........... G06F 1/3215
345/174
2016/0259467 A1* 9/2016 Nayyar ............. G06F 3/041661
2017/0277265 A1* 9/2017 Kuan ....................... G06F 3/017
2017/0344174 A1* 11/2017 Pant ...................... G06F 3/0441
2017/0344187 A1* 11/2017 Ko ........................ G06F 3/0443
2018/0059866 A1* 3/2018 Drake ................... G06F 3/0446
2018/0067616 A1* 3/2018 Lee ..................... G06F 3/04186
2018/0364837 A1* 12/2018 Chen ..................... G06F 3/0412
2020/0326795 A1* 10/2020 Chang ................. G06F 3/04166
2021/0109609 A1* 4/2021 Holsen .................. G06F 1/3259
2021/0117047 A1* 4/2021 Cho ...................... G06F 3/0448
2021/0141492 A1* 5/2021 Lee ....................... G06F 3/0445
2021/0333974 A1* 10/2021 Chen ..................... G06F 3/0446
2022/0222964 A1* 7/2022 Kwan .................... G06V 40/13
2023/0086442 A1* 3/2023 Van Ostrand ...... G06V 40/1306
345/173
2026/0118983 A1* 4/2026 Lin ....................... G06F 3/0412

* cited by examiner

SHIFTING OF INTERNAL AND EXTERNAL SENSOR BLOCKS FOR IN-CELL DISPLAY PANELS

RELATED APPLICATION

This application claims priority to U.S. Provisional Patent Application No. 63/761,741, titled "Shifting of Internal and External Touch Sensor Blocks for InCell Panels," filed on Feb. 21, 2025, which is hereby incorporated by reference in its entirety.

TECHNICAL FIELD

This application relates to electronic circuit, and in particular integrated circuits, electronic components, electronic devices, electronic systems, and methods for implementing touch sensing scans on a touch display.

BACKGROUND

An in-cell display directly integrates touch sensors into a display panel itself. The display panel of the in-cell display includes multiple predefined partitions that allows for segmentation of a touch-sensitive area into distinct zones, each capable of being individually monitored for user interaction. The in-cell display may be configured to scan either a selected subset of these partitions or all partitions, depending on application requirements and desired power efficiency. This flexible scanning approach enables optimized resource usage, particularly in scenarios where only specific regions of the display require active touch monitoring. However, this approach introduces certain technical challenges. For instance, if a scan rate is not sufficiently fast, the system may exhibit reduced responsiveness or miss brief touch events. Additionally, touch detection near the boundaries of adjacent partitions can lead to ambiguity or false activation, especially in cases of finger overlap or imprecise touch input. Mechanisms have been developed to implement robust calibration procedures during manufacturing or incorporate advanced signal processing techniques, such as noise filtering, debounce logic, and dynamic threshold adjustment. It would be beneficial to develop a more efficient mechanism to scan the partitions of the touch sensors of an in-cell display and detect touch events accurately and promptly.

SUMMARY

Various embodiments of this application are directed to integrated circuits, electronic components, electronic devices, electronic systems, and methods of implementing a shifting mechanism in internal and external touch multiplexing of touch displays. A touch display panel includes a capacitive sense array having a plurality of capacitive sensor elements. The plurality of capacitive sensor elements are grouped into a plurality of sensor blocks each of which can be independently selected and scanned. Internal multiplexers are applied in a sensor block to select an internal output of the sensor block from output signals of touch sensors of different sensor bands, and external multiplexers (e.g., band multiplexer, block multiplexer) are applied to provide an external output of the sensor block from the internal outputs associated with different internal multiplexers.

In some embodiments, when a touch event occurs near a boundary of one of the plurality of sensor blocks, the one of the plurality of sensor blocks and its immediately adjacent sensor block may both be selected and scanned to collect touch data associated with the touch event. Alternatively, in some embodiments, a touch region corresponds to an area where the touch event may be detected subsequently. The touch region is shifted towards the immediately adjacent sensor block from the one of the plurality of sensor blocks where the touch event occurs near the boundary, and needs to be scanned. The touch region has the same area as, or a smaller area than, each capacitive sensor block. In other words, the touch region is a combination of two portions of two immediately adjacent sensor blocks, and a location of the touch event is moved away from a boundary of any sensor block. By these means, the touch region including portions of two neighboring sensor blocks may be scanned to collect touch data near the boundary of the one of the plurality of sensor blocks accurately and efficiently.

In one aspect of this application, a method is implemented at a touch display panel including a capacitive sense array having a plurality of capacitive sensor elements. The method includes obtaining a plurality of capacitive sensing signals measured from the capacitive sense array. The capacitive sense array includes a plurality of predefined sensor blocks that further includes a first sensor block and a second sensor block immediately adjacent to the first sensor block. The method further includes detecting a touch event at a touch location in the first sensor block based on the plurality of capacitive sensing signals and determining a touch region based on the touch location. The touch region includes a first set of capacitive sensor elements in the first sensor block and a second set of capacitive sensor elements in the second sensor block. The method further includes scanning the touch region including the first set of capacitive sensor elements in the first sensor block and the second set of capacitive sensor elements in the second sensor block, e.g., in a scan cycle.

In some embodiments, the method further includes selecting the first set of capacitive sensor elements in the first sensor block and the second set of capacitive sensor elements in the second sensor block jointly by an external multiplexer. Further, in some embodiments, the method further includes sequentially outputting associated capacitive sense signals of the first set of capacitive sensor elements and the second set of capacitive sensor elements via an output of the external multiplexer.

In another aspect, an electronic device includes a capacitive sense array having a plurality of capacitive sensor elements and a processing device coupled to the capacitive sense array. The capacitive sense array includes a plurality of predefined sensor blocks that further includes a first sensor block and a second sensor block immediately adjacent to the first sensor block. The processing device is configured to obtain a plurality of capacitive sensing signals measured from the capacitive sense array, detect a touch event at a touch location in the first sensor block based on the plurality of capacitive sensing signals, and determine a touch region based on the touch location. The touch region includes a first set of capacitive sensor elements in the first sensor block and a second set of capacitive sensor elements in the second sensor block. The processing device is further configured to scan the touch region including the first set of capacitive sensor elements in the first sensor block and the second set of capacitive sensor elements in the second sensor block.

In yet another aspect, an electronic device includes a controller and memory storing instructions to be executed by the controller. The memory includes instructions for obtaining a plurality of capacitive sensing signals measured from a capacitive sense array having a plurality of capacitive sensor elements. The capacitive sense array includes a plurality of predefined sensor blocks that further includes a first sensor block and a second sensor block immediately adjacent to the first sensor block. The memory further includes instructions for detecting a touch event at a touch location in the first sensor block based on the plurality of capacitive sensing signals and determining a touch region based on the touch location. The touch region includes a first set of capacitive sensor elements in the first sensor block and a second set of capacitive sensor elements in the second sensor block. The memory further includes instructions for scanning the touch region including the first set of capacitive sensor elements in the first sensor block and the second set of capacitive sensor elements in the second sensor block.

In some situations, the touch region is adaptively formed to enable local scanning of a touch event of an active stylus efficiently. Other advantages include, but are not limited to, gate parking noise avoidance, efficient manufacturing test, reduction of a noise scan time in charger armor, reduction of an active stylus scan time, and finger scan performance improvement. In some embodiments, the touch region is formed based on two of the plurality of sensor blocks that are controlled by one or more external multiplexers on an array level of the capacitive sense array. Alternatively, in some embodiments, the touch region is formed based on two sensor bands that are controlled by one or more internal multiplexers on a block level of the sensor blocks of the capacitive sense array. In some implementations, the processing device scans an entire area of the touch display panel, while still having a straight internal multiplexer. This enhances efficiency in cost, scan time, and circuit area. For example, a smaller number of signal interconnects is needed to connect from a driver integrated circuit (IC) to columns of the touch display panel, thereby reducing a number of driver integrated circuits for driving the touch display panel and a bezel width needed for routing the signal interconnects.

These illustrative embodiments are mentioned not to limit or define the disclosure, but to provide examples to aid understanding thereof. Additional embodiments are discussed in the Detailed Description, and further description is provided there.

BRIEF DESCRIPTION OF DRAWINGS

The disclosed embodiments have other advantages and features, which will be more readily apparent from the detailed description, the appended claims, and the accompanying figures (or drawings). A brief introduction of the figures is below.

Like reference numerals refer to corresponding parts throughout the several views of the drawings.

DETAILED DESCRIPTION

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
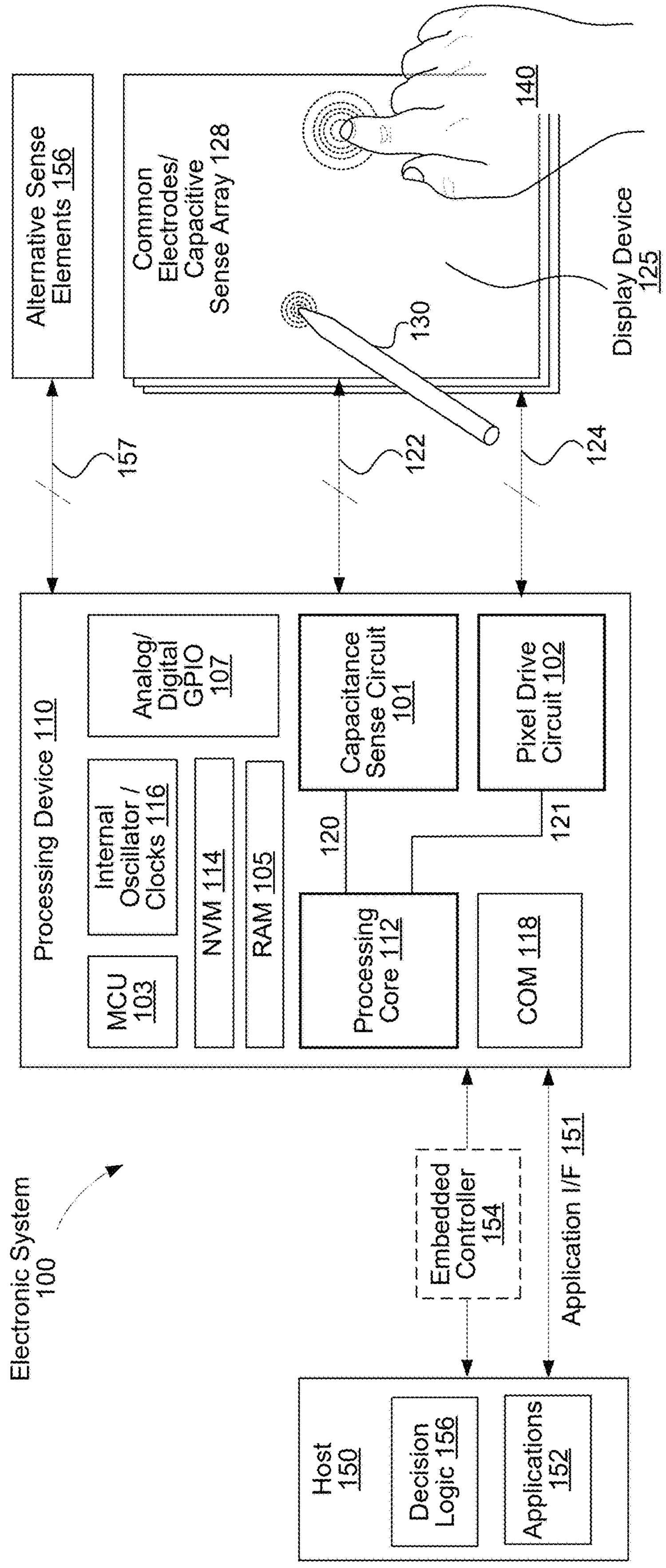
FIG. 1 is a block diagram of an electronic system, in accordance with some embodiments.

FIG. 1 is a block diagram of an electronic system 100, in accordance with some embodiments. In the electronic system 100, a processing device 110 is electrically coupled to a display panel 125 including a display pixel array. The display pixel array further includes a plurality of display pixels, a plurality of control lines, and a plurality of data lines. Each display pixel is powered between a display power supply and a ground supply. The processing device 110 operates in a display driving mode in which a drive voltage is generated to drive a data line of each display pixel to enable display of a corresponding color on the respective display pixel with a respective luminance level. In some embodiments, the processing device 110 includes a processing core 112 that provides display information (e.g., display content data of a sequence of image frames) to a touch-integrated timing controller (TTCON) 204 and touch-embedded source drivers (TSDs) 206, such that the TSDs 206 can drive individual display pixels in the display panel 125 to display images or video clips based on the display information. In some embodiments, the processing core 112 includes some or all functions of the TTCON 204 and TSDs 206 (i.e., part or all of the TTCON 204 and TSDs 206 is integrated in the processing core 112). Further, in the depicted embodiment, the display pixel array of the display panel 125 is coupled to the processing device 110 via a bus 124, and configured to receive display driving signals (e.g., the drive voltages) from the processing device 110 via the bus 124. More specifically, the display driving signals are generated by the TSDs 206 of the processing device 110 and provided to the display panel 125 via the bus 124.

In some embodiments, the display panel 125 further includes a touch sense array (e.g., a capacitive sense array), and the processing device 110 can also operate in a touch sensing mode in addition to the display driving mode. Optionally, the touch sense array is formed on the same layer of electrically conductive material that coats the bottom surface of the top encapsulation layer and provides electrodes for the display pixel array. Optionally, the touch sense array is formed on an alternative layer of conductive material that is distinct from the layer of electrically conductive material providing the common electrodes for the display pixel array. The processing device 110 is configured to measure capacitance variations at the touch sense array and detect one or more touches proximate to a surface of the display panel 125. In some embodiments, the processing device 110 alternates between the display driving mode and the touch sensing mode according to a predetermined duty cycle (e.g., 80% in the display driving mode) for the display driving mode, and detects a contact with or a proximity to a touch sensing surface associated with the display pixel array without interfering with display operations of the display pixel array. Conversely, in some embodiments, the processing device 110 operates in the display driving mode and in the touch sensing mode independently of each other via the display pixel array and touch sense array, respectively.

In the touch sensing mode, capacitive sensor elements in the touch sense array may be used to allow the TSDs 206 of the processing device 110 to measure self-capacitance, mutual capacitance, or any combination thereof. In the depicted embodiment, the touch sense array is coupled to the processing device 110 via a bus 122, and configured to provide touch sense signals to the TSDs 206 of the processing device 110 via the bus 122. By these means, the processing device 110 detects the presence of a touch object 140, the presence of a stylus 130, or any combination thereof on the touch sense array. In an example, the touch object is an active stylus 130. The active stylus 130 operates as a timing master, and the processing device 110 adjusts the timing of the touch sense array to match that of the active stylus 130.

In some embodiments, the processing device 110 includes analog and/or digital general purpose input/output ("GPIO") ports 107. The GPIO ports 107 may be programmable. The GPIO ports 107 may be coupled to a Programmable Interconnect and Logic ("PIL"), which acts as an interconnect between the GPIO ports 107 and a digital block array of the processing device 110 (not shown). In some embodiments, the digital block array is configured to implement a variety of digital logic circuits (e.g., DACs, digital filters, or digital control systems) using configurable user modules ("UMs"). The digital block array may be coupled to a system bus. The processing device 110 may also include memory, such as random access memory ("RAM") 105 and non-volatile memory ("NVM") 114. The RAM 105 may be static RAM ("SRAM"). The non-volatile memory 114 may be flash memory, which may be used to store firmware (e.g., control algorithms executable by the processing core 112 to implement operations described herein). The processing device 110 may also include a memory controller unit ("MCU") 103 coupled to the memory and to the processing core 112. The processing core 112 is a processing element configured to execute instructions or perform operations. The processing device 110 may include other processing elements as would be appreciated by one of ordinary skill in the art having the benefit of this disclosure. It should also be noted that the memory may be internal to the processing device 110 or external to it. In the case of the memory being internal, the memory may be coupled to a processing element, such as the processing core 112. In the case of the memory being external to the processing device 110, the processing device 110 is coupled to the other device in which the memory resides as would be appreciated by one of ordinary skill in the art having the benefit of this disclosure. Some or all of the operations of the processing core 112 may be implemented in firmware, hardware, software, or some combination thereof.

In some embodiments, the touch-integrated timing controller (TTCON) 204 coupled to the processing core 112 is configured to generate a touch control signal 120 and a display drive signal 121. The touch control signal 120 and display drive signal 121 are applied to the TSDs 206 to detect touch locations and drive individual display pixels, respectively. Specifically, the touch control signal 120 is used to enable the touch sensing mode in which self or mutual capacitance of capacitive sensor elements of the touch sense array is optionally scanned by the TSDs 206. Touch data 126 are returned from the TSDs 206 to the TTCON 204. One or more touch locations are thereby detected if one or more objects touch a touch sensing surface of the electronic system 100. Alternatively, in some embodiments, the display drive signal 121 includes display content data and display control data, and is used to enable the display driving mode. In such a display driving mode, the TSDs 206 provide a drive voltage to each display pixel of the display pixel array based on the display content data. The display pixel displays an intended color with a certain luminance level upon receiving the drive voltage.

Optionally, the touch control signal 120 and the display drive signal 121 are time-multiplexed, and transmitted from the TTCON 204 to the TSDs 206 via the same forward link. Optionally, the touch control signal 120 and the display drive signal 121 are transmitted from the TTCON 204 to the TSDs 206 via distinct and different forward links, and thereby, processed by the TSDs 206 independently of each other (e.g., during two separate durations of time, concurrently during the same duration of time). As such, in some embodiments, an intra-panel communication interface between the TTCON 204 and TSDs 206 includes a set of display forward links, a set of touch forward links, and a set of backward links.

The processing device 110 may also include an analog block array (not shown) (e.g., a field-programmable analog array). The analog block array is also coupled to the system bus. An analog block array may be configured to implement a variety of analog circuits (e.g., ADCs or analog filters) using, in some embodiments, configurable universal machines. The analog block array may also be coupled to the GPIO 107.

The processing device 110 may include internal oscillator/clocks 116 and a communication block ("COM") 118. In some embodiments, the processing device 110 includes a spread-spectrum clock (not shown). The oscillator/clocks 116 provides clock signals to one or more of the components of processing device 110. The communication block 118 may be used to communicate with an external component, such as an application processor 152, via an application interface ("I/F") line 151. In some embodiments, the processing device 110 may also be coupled to an embedded controller 154 to communicate with the external components, such as a host 150. In some embodiments, the processing device 110 is configured to communicate with the embedded controller 154 or the host 150 to send and/or receive data.

The processing device 110 may reside on a common carrier substrate such as, for example, an integrated circuit ("IC") die substrate, a multi-chip module substrate, or the like. In some embodiments, the components of the processing device 110 may be one or more separate integrated circuits and/or discrete components. In some embodiments, the processing device 110 may be one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is also noted that the embodiments described herein are not limited to having a configuration of a processing device coupled to an application processor, but may include a system that measures the capacitance on the touch sense array and sends the raw data to a host computer 150 where it is analyzed by an application. In effect, the processing that is done by the processing device 110 may also be done in the application processor. Specifically, in some embodiments, instead of performing the operations of the processing core 112 in the processing device 110, the processing device 110 may send the raw data or partially-processed data to the host 150. The host 150, as illustrated in FIG. 1, may include decision logic 156 that performs some or all of the operations of the processing core 112. Operations of the decision logic 156 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing core 112 may be implemented in the decision logic 156, the applications 152, or in other hardware, software, and/or firmware external to the processing device 110. In some other embodiments, the processing device 110 is the host 150.

Each of the TTCON 204 and TSDs 206 may be integrated into the IC of the processing device 110, or in a separate IC that is optionally disposed in proximity to the display panel 125. In some embodiments, descriptions of the TTCON 204 and TSDs 206 may be generated and compiled for incorporation into other integrated circuits. For example, behavioral level code describing the TTCON 204 or TSDs 206, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout and stored to a machine-accessible medium. The behavioral level code, the RTL code, the netlist, and the circuit layout may represent various levels of abstraction to describe the TTCON 204 or TSDs 206.

It is noted that the components of the electronic system 100 may include all of the components described above. In some embodiments, the electronic system 100 includes fewer than all of the components described above. In some embodiments, the electronic system 100 is used in a tablet computer. In some embodiments, the electronic device is used in other applications, such as a desktop computer, a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The embodiments described herein are not limited to touch screens or touch-sensor pads for notebook embodiments.

Figure 2:
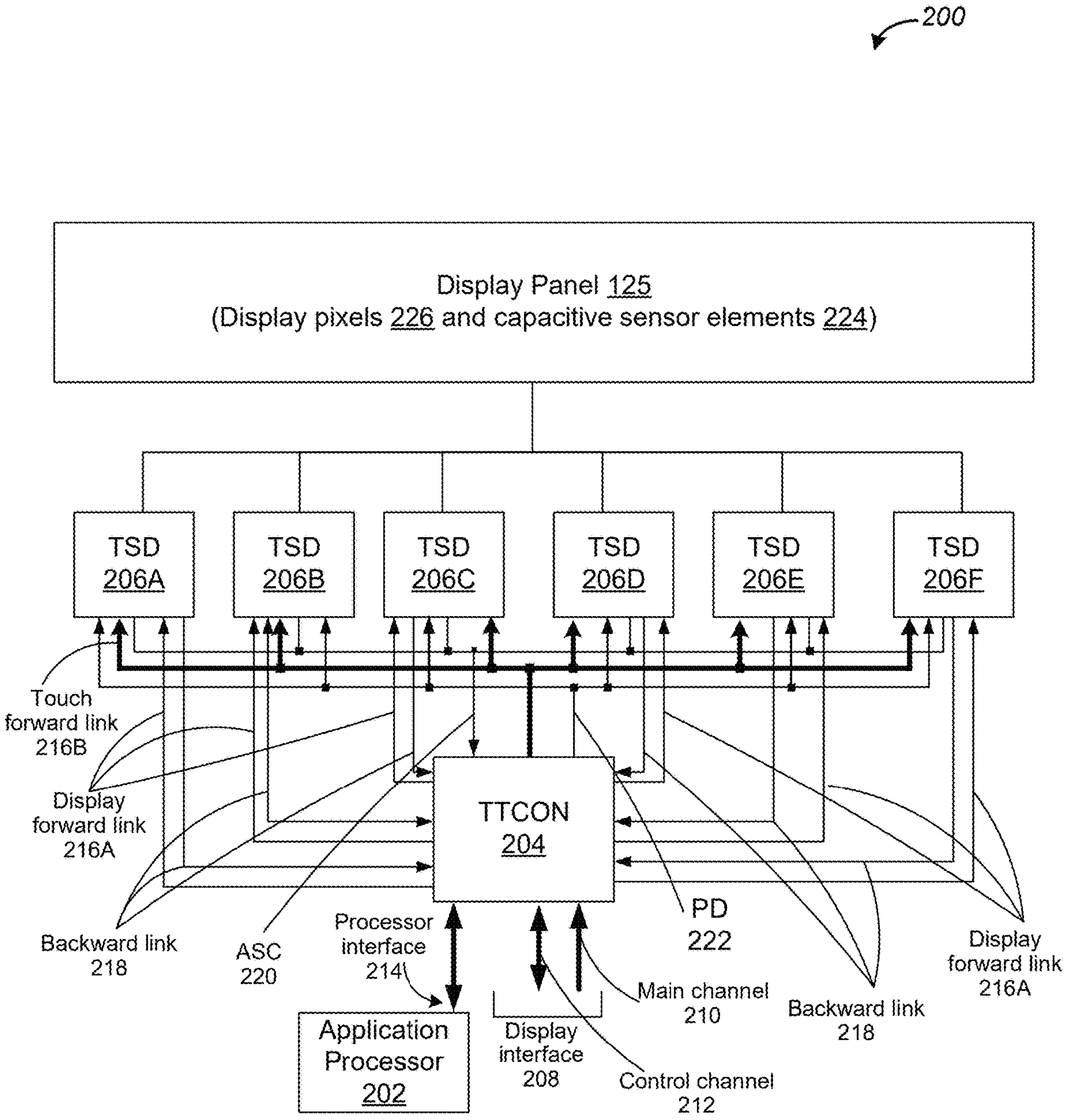
FIG. 2 is a block diagram illustrating a touch panel display subsystem including a scalable intra-panel interface (SIPI) between a touch-integrated timing controller (TTCON) and touch-embedded source drivers (TSDs), in accordance with some embodiments.

FIG. 2 is a block diagram illustrating a touch panel display subsystem 200 including a scalable intra-panel interface (SIPI) between a touch-integrated timing controller (TTCON) 204 and touch-embedded source drivers (TSDs) 206, in accordance with some embodiments. The touch panel display subsystem 200 includes one or more of: the TTCON 204, the one or more TSDs 206, a plurality of forward links 216, a set of backward links 218, an auxiliary status channel (ASC) 220, a power management bus (PD) 222, a plurality of touch sensors 224, and a plurality of display pixels 226. The TTCON 204 receives display content data and control data from a source device (e.g., a processing core 112 in FIG. 1), and generates a display drive signal and a touch control signal to provide the display content data and control data to TSDs 206. The TTCON 204 includes a display interface 208 for receiving the display content data and control data. The plurality of forward links 216 and the set of backward links 218 form a bi-directional (SIPI) between the TTCON 204 and the TSDs 206 of the touch panel display subsystem 200.

The display interface 208 receives the display content data from the source device for display on the display panel 125. The display content data may include one or more combination of video, image data, and audio data of various formats. The control data received via the display interface 208 includes address, timing, and other control information used by the TTCON 204 to control the operation of the TSDs 206 or send display status data 126 from one or more TSDs 206 to the TTCON 204. In an example, a TSD 206 is embodied in an integrated circuit, die, or computing device included within a system that includes the touch panel display subsystem 200. In another example, a TSD 206 is part of an external computing system, such as a set-top box, digital video disk player, or other external computing device that generates display content data and control data suitable to be received by the TTCON 204 over the display interface 208. In some embodiments, the display interface 208 is included in a graphics processing unit (GPU).

In some embodiments, the display interface 208 includes a main channel 210 and a control channel 212. The main channel 210 carries the display content data for display on the display panel. The control channel 212 carries the control data that is associated with the display content data and transferred via bi-directional communication between each of the TSDs 206 and the TTCON 204. Example control data includes training information, and test and debug information. The control channel 212 also carries status information, including data error rate as measured at one or a combination of the TSD 206 and the TTCON 204. In some embodiments, the control channel 212 carries the display control data used by the display drive signal 121, and the display control data includes one or more of: vertical timing signals (e.g., vertical sync (VSYNC) or frame pulse (FP)), horizontal timing signals (e.g., horizontal sync (HSYNC) or line pulse (LP)), and global timing signals (e.g., display refresh signals for refreshing a displayed image, clock signals for operating gate drivers, and clock and latch enable for operating TSDs 206).

The processor interface 214 of the TTCON 204 supports bi-directional communication between an application processor 202 and the TTCON 204. The application processor 202 supports applications running in an operating system environment. Example applications include applications displaying content on the display panel 125 for interaction with a user. For example, the application processor 202 interprets actions associated with interactions with content displayed in the display panel. Example actions may include navigation, content selection, or any other suitable action interacting with the display content. In some embodiments, the application processor 202 is combined with the display interface 208. For example, the application processor 202 may be embedded in the GPU core having a display interface 208. In some embodiments, the TTCON 204 receives application data from the application processor 202 via the processor interface 214 and transmits touch sensor data received from one or more TSDs 206 to the application processor 202 for further processing. In some embodiments, the TTCON 204 receives one or more touch controller commands from an external processor via the processor interface 214 to regulate the transmission of touch data 120 from the TSDs 206 to the TTCON 204.

The ASC 220 of the TTCON 204 is a single line communication link that enables the TSDs 206 to provide status information to the TTCON 204. Example status information includes link information such as symbol lock status or symbol error count. The ASC 220 is shared by multiple TSDs 206 through a multi-drop configuration. In some embodiments, a single ASC 220 connects all of the TSDs 206 in the touch panel display subsystem to a single TTCON 204. In another embodiment, multiple ASCs 220 may be used, with each ASC 220 connected to a subset of TSDs 206. In addition, multiple TTCONs 204 may be used to communicate with TSDs through multiple ASCs 220.

The PD 222 of the TTCON 204 enables the TTCON 204 to send power control information to control the operation state of the TSDs 206.

The SIPI of the TTCON 204 includes a plurality of forward links 216 and a set of backward links 218. Each of the links 216 and 218 operates in accordance with a SIPI standard. The plurality of forward links 216 transmits display content data and control data from the TTCON 204 to each TSD 206. The plurality of forward links 216 includes one or more data channels, each data channel embodied as a differential pair of conductors. In some embodiments, the one or more data channels are AC or DC-coupled differential pairs with double termination. In some embodiments, the number of data channels included in the forward links 216 is scalable. In an example, the plurality of forward links 216 includes two data channels. The number of data channels may be greater than two to satisfy the maximum transmission throughput used for a specific implementation of the touch panel display subsystem 200.

Further, the plurality of forward links 216 includes a first subset of display forward links 216A and a second subset of touch forward links 216B for the purposes of transmitting display-related data and control signals separately from touch-related control signals. That said, the first subset of display forward links 216A is used to transmit a display drive signal 121 including display content data and display control data, and the second subset of touch forward links 216B is used to transmit a touch control signal 120, independently of the display forward links 216A. Each display forward link is coupled between the TTCON 204 and a respective TSD 206A to provide distinct display content data and control data to the respective TSD 206A. In contrast, in some embodiments, the set of touch forward links 216B is a point to point communication link for touch forward links coupled between the TTCON 204 and the TSDs 206 to provide the TSDs 206 with the same touch control signal 120.

In some embodiments, each backward link 218 includes a single differential pair of signal conductors that transmit touch data from each TSD 206 to the TTCON 204. In some embodiments, the digital data transmitted over each backward link 218 includes touch data 126 (e.g., touch-related confirmation data, status data, touch sensor data) received from the capacitive sensor elements 224. In some embodiments, each backward link 218 has similar and identical electrical characteristics to each of the forward links 216.

Each TSD 206 receives multi-bit digital display content data and control data from the TTCON 204 via the forward links 216, converts the display content data to analog voltage levels, and provides the analog voltage levels to pixels in the display panel 125. The transmission path formed by the output of each TSD 206 to the input of each pixel in a specific column of pixels is referred to herein as an output channel or channel. A TSD 206 includes multiple output buffers, where each output buffer operates to rapidly charge the column line capacitance of the corresponding channel. The TSD 206 also receives touch sensor data from one or more capacitive sensor elements 224 and sends the received touch sensor data to the TTCON 204 via the respective backward link 218 for further processing. In some embodiments, a group of TSDs 206 is coupled to a single capacitive sensor element 224.

Each capacitive sensor element 224 measures physical interactions with a portion of the display panel and obtains information describing location, position, force, and interaction duration information of the physical interaction with the display panel. For example, when an object (e.g., a finger) touches the display panel, the capacitive sensor element 224 measures an analog signal indicating the physical interaction, and the analog signal is converted into digital data (i.e., touch data 126), in a corresponding TSD 206. The touch data 126 is then transmitted to the TTCON 204 over a corresponding backward link 218 for further processing. Touch information can be extracted in the TTCON 204 from the touch data 126. Example touch information includes position of a touch event relative to reference point on the display panel 125, force applied on the display panel 125, and touching duration indicating the duration of the touch event. The capacitive sensor element 224 may employ well-known methods, including resistive and capacitive elements to detect a touch event. In some embodiments, the capacitive sensor elements 224 are integrated with a transparent touch-sensitive material disposed on the display panel. Alternatively, the capacitive sensor elements 224 may be integrated into the display panel 125. The number of capacitive sensor elements 224 varies based on the size of a display area and a size of each capacitive sensor element. Each capacitive sensor element 224 is coupled to a group of column drivers that are placed physically in proximity to the capacitive sensor element 224.

Figure 3:
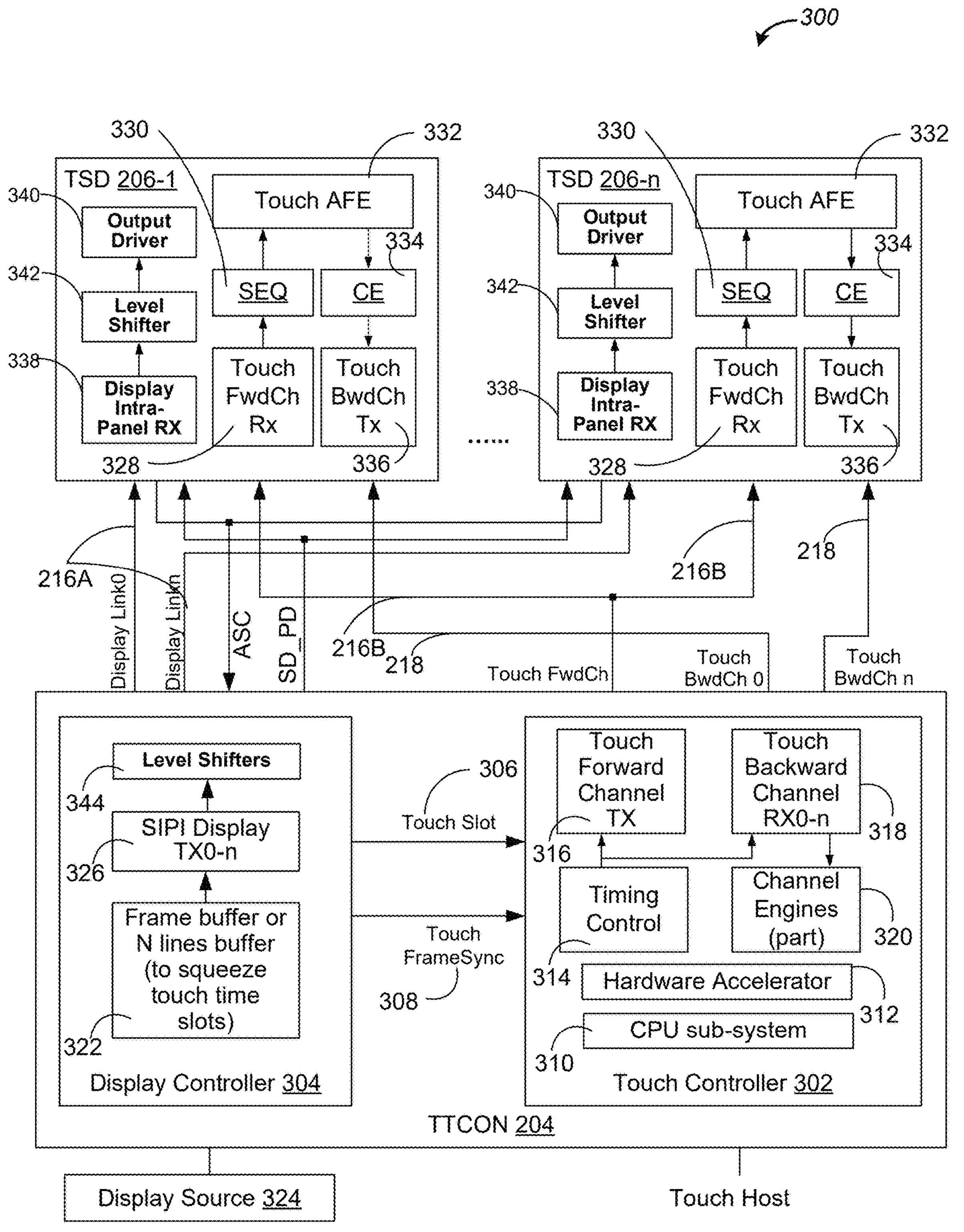
FIG. 3 is a block diagram of a touch panel display subsystem having a TTCON and a plurality of TSDs, in accordance with some embodiments.

FIG. 3 is a block diagram of a touch panel display subsystem 300 having a TTCON 204 and a plurality of TSDs 206, in accordance with some embodiments. The TTCON 204 and TSDs 206 are coupled to each other via an intra-panel interface including at least a set of display forward links 216A, a set of touch forward links 216B, and a set of backward links 218. Specifically, the TTCON 204 is coupled to each TSD 206 via a display forward link 216A, a touch forward link 216B, and a backward link 218. For each TSD 206, the display forward link 216A is configured to transmit a display drive signal 121 including display content data and display control data. For each TSD 206, the touch forward link 216B is distinct from the display forward link 216A and configured to transmit a touch control signal 120 including an instruction to initiate an operation mode on the one or more TSDs or the plurality of capacitive sensor elements 224, and the backward link 218 is configured to return the touch data 126 generated according to the operation mode to the TTCON 204. The display drive signal 121 transmitted via the display forward link 216A and the touch data 126 returned via the backward link 218 are distinct for each TSD 206, and therefore, each of the display forward link 216A and backward link 218 is a point-to-point link. In some embodiments, each touch forward link 216B is a point-to-point link. Alternatively, in some embodiments, the touch control signal 120 is address aware and each TSDs 206 has address assigned, and the touch forward link 216B is a multi-drop link connecting the TTCON 204 to all TSDs 206.

The touch forward link 216B is used to deliver touch configuration, touch timing control, and touch power control. For example, the touch control signal 120 passed by the touch forward link 216B is used to enable functions including, but are not limited to, dividing a touch receiver clock for a touch clock, dividing self synchronization by a dedicated k-code, synchronizing operations of the capacitive sensor elements 224 and active stylus 130, synchronizing a touch clock divider, reading the touch data 126, configuring a touch analog frontend (AFE) (e.g., a touch AFE 332 in FIG. 3), and providing a touch backward channel clock source. In contrast, the touch data 126 collected via the backward link 218 includes, but is not limited to, touch sensor data, data concerning a touch forward link quality, a debug status, and a touch forward link lock/unlock indicator.

In some embodiments, commands, configurations and instructions/requests are sent by the TTCON 204 through the forward links 216 only. From a system control perspective, the TTCON 204 is a master, and the TSDs 206 are slaves subject to the control of the TTCON 204.

The TTCON 204 includes a touch controller 302 and a display controller 304 configured to control the TSDs 206 to measure touch sense data from the capacitive sensor elements 224 and drive the display pixels 226, respectively. In some embodiments, display driving and touch sensing are synchronized, e.g., time-multiplexed with respective duty cycles. The display controller 304 sends a touch slot signal 306 or a touch frame synchronization signal 308 to synchronize itself with the touch controller 302 based on a slot or an image frame, respectively. Optionally, each slot corresponds to a short duration of time separating two rows of display content data, and touch sensing is implemented in the short duration of time. A complete scan of the capacitive sensor elements 224 is conducted in a single slot or a plurality of slots separating multiple rows of display content data.

The touch controller 302 includes a CPU sub-system 310, a hardware accelerator 312, a timing control module 314, a touch forward channel transmitter 316, a plurality of touch backward channel receivers 318, and a channel engine 320. The CPU subs-system 310, hardware accelerator 312, and channel engines 320 are collectively called a touch sensing engine. A touch control signal 120 is generated by the timing control module 314, and sends to the TSDs 206 via the touch forward channel transmitter 316. Touch data 126 returned by the TSDs 206 are received by the touch backward channel receivers 318, and provided to channel engine 320 for further processing, e.g., identifying one or more touch events on different areas of a touch sensing surface of the display panel 125.

The touch forward channel transmitter 316 is coupled to a touch forward channel receiver 328 of each TSD 206, and configured to transmit the touch control signal 120 to the touch forward channel receiver 328, e.g., in a serial data format. Each TSD 206 further includes a deserialization module 330, a touch AFE 332, a channel engine 334, and a touch backward channel transmitter 336. The deserialization module 330 is configured to convert the touch control signal 120 to internal touch control signals or recover a touch clock signal locally. The internal touch control signals and the touch clock signal are used to control the touch AFE 332 to measure touch sense data from the capacitive sensor elements 224 in the display panel 125, e.g., scanning a subset or all capacitive sensor elements 224. The touch sense data is captured by the touch AFE 332 and pre-processed in the channel engine 334 before it is passed to the touch backward channel transmitter 336. The touch backward channel transmitter 336 is coupled to a respective touch backward channel receiver 318 of the touch controller 302 via a respective backward link 218, thereby returning the touch sense data to the touch controller 302 via the respective backward link 218.

In some embodiments, the electronic components 328-336 associated with touch detection are distributed in different TSDs 206-1 to 206-*n*, and may be collectively called capacitance sense circuit 101 (FIG. 1). The electronic components 338-340 associated with display driving are distributed in different TSDs 206-1 to 206-*n*, and may be collectively called pixel drive circuit 102 (FIG. 1). The TTCON 204 is part of a processing core 112 of a processing device 110 of an electronic system 100 (FIG. 1).

In contrast, the display controller 304 of the TTCON 204 includes a buffer unit 322 (e.g., a frame buffer or a plurality of line buffers) and a plurality of display intra-panel transmitters 326. The buffer unit 322 is configured to store display content data received from a display source 324 in frame or in line. The display intra-panel transmitters 326 are configured to extract the display content data in the frame buffer or line buffers 322 and send the display content data to the display forward links 216A coupled to the TSDs 206. On the TSD side, each TSD 206 has a display intra-panel receiver 338 coupled to a respective display forward link 216A and configured to receive a subset of display content data corresponding to the respective TSD 206. A display output driver 340 is configured to receive the subset of display content data from the display intra-panel receiver 338 and drive a subset of the display pixels 226 using the subset of display content data, thereby allowing still images or video clips associated with the display content data to be displayed on the display panel 125.

In some embodiments, one or more level shifters 342 are coupled to, or included in, the display output driver 340. The one or more level shifters 342 are configured to convert an input signal varying between two input supply levels to an output signal varying between two output supply levels, and at least one of the two input supply levels is different from the two output supply levels. In an example (e.g., associated with TFT LCDs), a difference between the two output voltage supply levels of the display output driver 340 may be equal to 10V to 15V, for controlling pixel gate drivers, requiring level shifters to step up signals from lower voltage logic levels (e.g., 5V). Alternatively, in some embodiments, one or more level shifters 344 are coupled at an output of the display controller 304 or an input of a TSD 206. For example, the display controller 304 operate at 3.3V logic, and the TSD 206 requires 5V logic for proper operation. In this case, the level shifter 344 is configured to convert the 3.3V signals from the display controller 304 to 5V signals for the TSD 206 and vice versa, ensuring bidirectional communication.

Figure 4B:
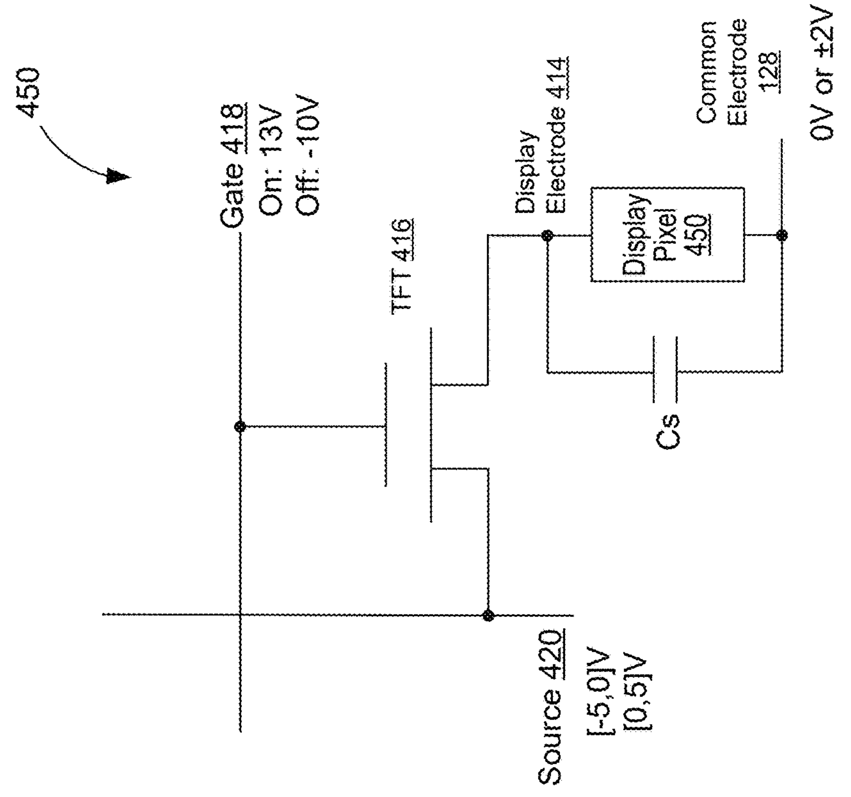
FIG. 4B illustrates an example display pixel driven by a display electrode and a common electrode in a display driving state, in accordance with some implementations.
Figure 4A:
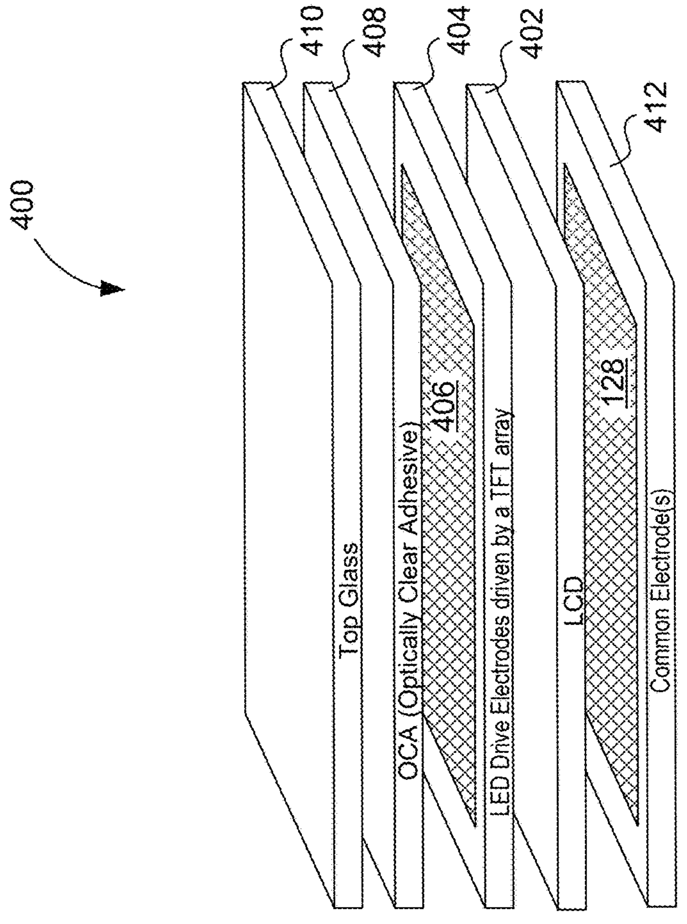
FIG. 4A illustrates an example touch screen assembly including a common electrode array that is reconfigured to a capacitive sense array 128, in accordance with some implementations.

FIG. 4A illustrates an example touch screen assembly 400 (e.g., a liquid crystal display screen) including a common electrode array that is reconfigured to a capacitive sense array 128, in accordance with some implementations. The touch screen assembly 400 includes a liquid crystal display (LCD) 402 overlaid by the glass 404. A display pattern 406 is constructed on a surface of the glass 404 to form a footprint of a display pixel array. Optionally, as shown in FIG. 4A, the display pattern 406 is constructed on a top surface of the glass 404 that faces away from the LCD 402 or on a bottom surface of the glass 404 that faces the LCD 402. The display pattern 406 includes a plurality of display electrodes for driving a plurality of display pixels made of LCD molecules of the LCD 402. Optically clear adhesive (OCA) 408 is used to bond a top glass 410 to the surface of the glass 404 on which the display pattern 406 is constructed, thus protecting the display pattern 406. The touch screen assembly 400 further includes a common electrode array 128 opposing the plurality of display electrodes formed on display pattern 406. Stated another way, the common electrode array 128 is formed on a glass 412 disposed under the LCD 402 and oppose the glass 404. As such, each display pixel of the LCD 402 is disposed between a respective display electrode and a respective common electrode that are formed on the display pattern 406 and the common electrode layer 128, respectively.

In some implementations not shown in FIG. 4A, the display pattern 406 is constructed on a surface of the glass 404 to form a footprint of a display pixel array, and the glass 404 is disposed under the LCD 402. The common electrode array 128 is formed on the glass 412, and the glass 412 is disposed above the LCD 402 and oppose the glass 404. The top glass 410 is bonded to the glass 412 using OCA 408 for protecting the common electrode layer 128. Each display pixel of the LCD 402 is still disposed between a respective display electrode and a respective common electrode that are formed on the display pattern 406 and the common electrode layer 128, respectively.

In some implementations, a first thin film transistor (TFT) array is formed on the glass 404 to drive the display electrodes formed on the display pattern 406. More specifically, a gate layer, a semiconductor layer, a source/drain layer, one or more conductive layers and one or more intervening insulating layers are deposited on the glass 404. These material layers are lithographically patterned on the glass 404 to form functional part (e.g., gate, source and drain) of the TFTs as well as the row and column lines of the first TFT array. For each individual display pixel of the LCD 402, the respective display electrode is electrically coupled to a respective TFT of the first TFT array. The first TFT array is configured to receive display driving signals from the processing device 110 (more specifically, the pixel drive circuit 102 of the processing device 110), and generates a first electrical voltage or current to drive the display electrode of each display pixel. As the first electrical voltage or current is applied to the liquid crystal molecules corresponding to each display pixel, the molecules tend to untwist from its original twisted form, and cause a change in the angle of an incident light. Stated another way, the first TFT array includes a two dimensional (2D) array of TFTs, row lines and column lines. As shown in FIG. 4B, each TFT of the first TFT array is connected between a respective row line and a respective column line, and configured to provide the first electrical voltage or current to drive the corresponding liquid crystal molecules of the corresponding display pixel. In some implementations, the entire common electrode layer 128 is electrically coupled to a reference voltage (sometimes referred to as VCOM). In some implementations, the common electrodes 128 corresponding to the display pixels are driven individually or in group as explained below.

It is noted that in some implementations, a second thin film transistor (TFT) array is formed on the glass 412 to drive the common electrodes 128. More specifically, a gate layer, a semiconductor layer, a source/drain layer, one or more conductive layers and one or more intervening insulating layers are deposited on the glass 412. These material layers are lithographically patterned on the glass 412 to form functional part (e.g., gate, source and drain) of the second TFTs as well as the row and column lines of the second TFT array. For each individual display pixel of the LCD 402, the respective common electrode is electrically coupled to a respective TFT of the second TFT array. The TFT array is configured to receive display driving signals from the processing device 110, and generates a second electrical voltage or current to drive the common electrode corresponding to each display pixel. As the first and second electrical voltages/currents are applied to the liquid crystal molecules corresponding to each display pixel, the molecules tend to untwist from its original twisted form, and cause a change in the angle of an incident light. Stated another way, the second TFT array includes a two dimensional (2D) array of TFTs, row lines and column lines. Each TFT of the second TFT array is connected between a respective row line and a respective column line, and configured to provide the second electrical voltage or current to drive the corresponding liquid crystal molecules of the corresponding display pixel in conjunction with the first electrical voltage or current. In some implementations, the common electrodes 128, the display electrodes, the first TFT array and the second TFT array (if used) are made of transparent material (e.g., indium-tin oxide (ITO)) to allow light to pass through from the side or the back of the touch screen assembly 400.

Figures 5A, 5B:
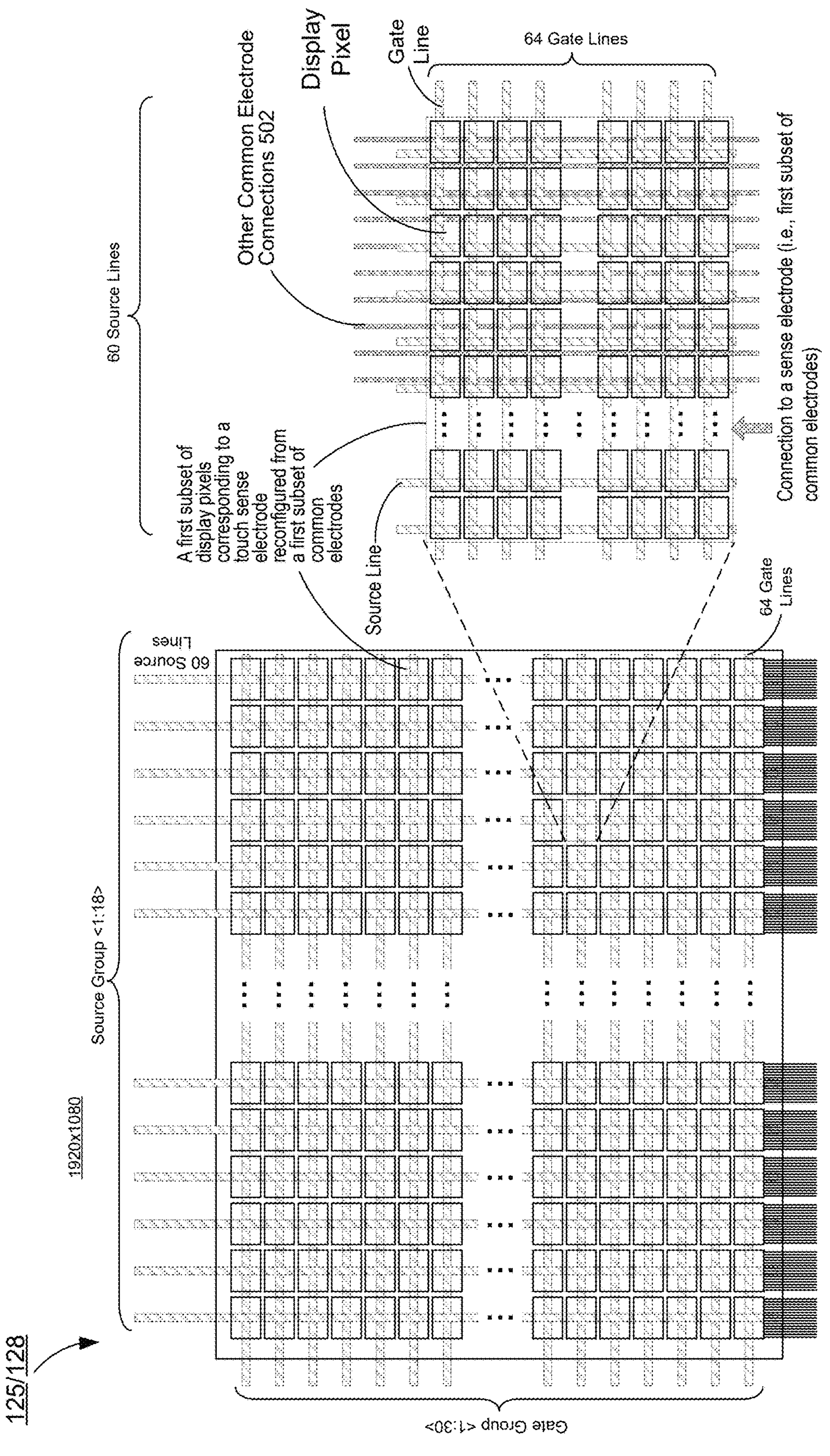
FIG. 5A is an example display pixel array that is reconfigured to a capacitive sense array, in accordance with some implementations.
FIG. 5B is an example capacitive sensor element that is reconfigured from a set of common electrodes of the display pixel array shown in FIG. 5A, in accordance with some implementations.

Optionally, the common electrode array 128 has a diamond pattern, a row-column pattern or a two-dimensional (2D) array of common electrodes (as shown in FIG. 5A). In some implementations related to the row-column pattern, the capacitive sense array 128 reconfigured from the common electrode array 128 includes row and column sense elements that can be expressed as a matrix of the intersections between row and column electrodes. In some implementations, the row and column sense elements are formed on two conductive layers that are electrically insulated from each other, and both of the conductive layers are formed on one of the top or bottom surfaces of the glass 412. In some implementations related to the 2D array of common electrodes, the 2D array of common electrodes includes a plurality of square or rectangular electrodes, and when reconfigured to the capacitive sense array 128, a set of adjacent common electrodes (e.g., a 2D array of 64×60 common electrodes) is grouped into a unit sense element for touch detection. The resolution of the common electrodes 128 is represented as the product of the number of rows and the number of columns associated with the common electrodes 128. The resolution of the reconfigured capacitive sense array 128 is represented as the product of the number of rows and the number of columns associated with the capacitive sensor elements. The resolutions of the common electrodes 128 and the reconfigured capacitive sense array 128 could be identical or distinct.

FIG. 4B illustrates an example display pixel 450 driven by a display electrode 414 and a common electrode 128 in a display driving state, in accordance with some implementations. As explained above, the display pixel 450 is disposed between the display and common electrodes. A first TFT 416 is connected between a respective row (gate) line 418 and a respective column line 420, and configured to provide the first electrical signal to drive the display electrode 414 of the corresponding display pixel 450. In the case of LCD display pixels, the first electrical signal and another second electrical signal are applied onto the display and common electrodes, respectively, and therefore to the liquid crystal molecules corresponding to the display pixel 450. The molecules tend to untwist from their original twisted form, and cause a change in the angle of an incident light, thereby causing display of a color at a location corresponding to the display pixel 450.

The first TFT 416 is formed on the glass 404 to drive the display electrode 414 that is formed on the same glass substrate. More specifically, a gate layer, a semiconductor layer, a source/drain layer, one or more conductive layers and one or more intervening insulating layers are deposited on the glass 404. These material layers are lithographically patterned on the glass 404 to form functional part (e.g., gate, source and drain) of the first TFT 416 as well as the row (gate) line 418 and the column (source) line 420 of the first TFT 416. The first TFT 416 is configured to receive display driving signals from the processing device 110 (more specifically, the pixel drive circuit 102 of the processing device 110), and generates the first electrical signal to drive the display electrode 414 of the display pixel 450.

In some implementations (not shown in FIG. 4B), the display pixel 450 includes a second TFT to generate the second electrical signal to drive the common electrode 128. The second TFT is formed on the glass 412 to drive the common electrode 128 that is formed on the same glass substrate. A gate layer, a semiconductor layer, a source/drain layer, one or more conductive layers and one or more intervening insulating layers are deposited on the glass 412. These material layers are lithographically patterned on the glass 404 to form functional part (e.g., gate, source and drain) of the second TFT as well as a row (gate) line and a column (source) line of the second TFT. The first TFT is configured to receive the display driving signals from the processing device 110 (more specifically, the pixel drive circuit 102 of the processing device 110), and generates the second electrical signal to drive the common electrode 128 of the display pixel 450.

In an example, in the display driving state, the common electrode 128 is coupled to the ground (e.g., 0V) or another reference voltage (e.g., 2V and −2V). The gate line 418 is coupled to a TFT turn-on voltage $V_{GH}$ (e.g., 13V) to turn on the first TFT 416, such that the display electrode 414 is electrically driven by an electrical signal delivered to the source 420 of the first TFT 416. Optionally, the electrical signal of the source 420 has a magnitude of +5V or −5V, and the first electrical signal applied on the display electrode 414 tracks the electrical signal of the source. In another example, the common electrode 128 is coupled to the ground (e.g., 0V). The gate line 418 is coupled to a TFT turn-off voltage $V_{GL}$ (e.g., −10V) to turn off the first TFT 416, such that the display electrode 414 is electrically decoupled from the electrical signal delivered to the source 420 of the TFT 416. Regardless of the magnitude of the electrical signal the source 420 has, the first electrical signal at the display electrode 414 does not track the electrical signal of the source 420.

FIG. 5A is an example display pixel array that is reconfigured to a capacitive sense array 128, in accordance with some implementations, and FIG. 5B is an example capacitive sensor element that is reconfigured from a set of common electrodes 128 of the display pixel array shown in FIG. 5A, in accordance with some implementations. The display pixel array has a first resolution (e.g., 1920×1080), and the capacitive sense array 128 reconfigured from the display pixel array has a second resolution (e.g., 30×18). The display pixel array includes a plurality of display pixels (e.g., approximately 2M pixels arranged on the LCD 402), a plurality of display electrodes (e.g., approximately 2M display electrodes arranged on the glass 404), and a plurality of common electrodes. Each display pixel 450 is disposed between a display electrode 414 and a common electrode 128. Each display pixel 450 is accessed by a column line (also called a source line 420) and a row line (also called a gate line 418). The column and row lines are configured to control the respective TFT 416 associated with each display pixel 450 to drive the display electrode 414. In an example, the display pixel array has a first number (e.g., approximately 2M) of display pixels arranged to 1920 rows and 1080 columns.

In some implementations, the common electrodes 128 of the display pixel array are reconfigured to operate as the capacitive sense array 128 having a second resolution, such that the capacitive sense array 128 includes a second number (e.g., 540) of capacitive sensor elements. In a specific example as shown in FIG. 5B, each sense element includes 64 rows and 60 columns of common electrodes 128, and therefore, the entire capacitive sense array 128 has the second resolution of 30×18. Stated another way, the display pixel array includes an array of 1920×1080 display pixels and is divided into 30×18 pixel sets, and each pixel set includes 64×60 display pixels. The common electrodes 128 corresponding to each pixel set are grouped into one capacitive sensor element of the capacitive sense array 128. The pixel set corresponding to each sense element of the capacitive sense array 128 is driven by 64 gate lines and 60 source lines. In some implementations, the pixel set corresponding to each sense element of the capacitive sense array 128 includes a single common electrode, i.e., 64×60 display electrodes share the single common electrode. In some implementations, the pixel set corresponding to each sense element of the capacitive sense array 128 includes a third number (e.g., 64×60 or less) of common electrodes. Optionally, each of the third number of common electrodes corresponds to one or more display pixels in the pixel set. Optionally, the third number of common electrodes are electrically coupled to each other to form the corresponding sense element of the capacitive sense array 128.

Referring to FIG. 5A, in the touch sensing state, the second number of sense elements of the reconfigured capacitive sense array 128 are scanned for detecting a contact with or a proximity to a touch sensing surface associated with the display pixel array. Further, referring to FIG. 5B, in each sense element of the reconfigured capacitive sense array 128, the common electrodes 128 are grouped to one or more touch sense signals that are measured by the capacitive sense circuit 101 of the processing device 110 for touch detection in the touch sensing state. However, the common electrodes 128 in each sense element are at least capacitively coupled to the display electrodes 414 via the display pixels corresponding to the respective sense element, and to the gate lines 418 and the source lines 420 via the TFTs 416 corresponding to the respective sense element. In addition, the common electrodes 128 in each sense element are also capacitively coupled to touch sense signals 502 of other sense elements when the touch sense signals 502 are routed via the respective sense element to an edge of the display device 125 to gain access to the processing device 110. As such, when the common electrodes 128 of the display pixel array are reconfigured to operate as the capacitive sense array 128, parasitic capacitance is created for each sense element of the capacitive sense array 128 because of existence of the corresponding display electrode 450, gate lines 418, source lines 420, and signal lines connected to common electrodes of other sense elements.

Figure 6A:
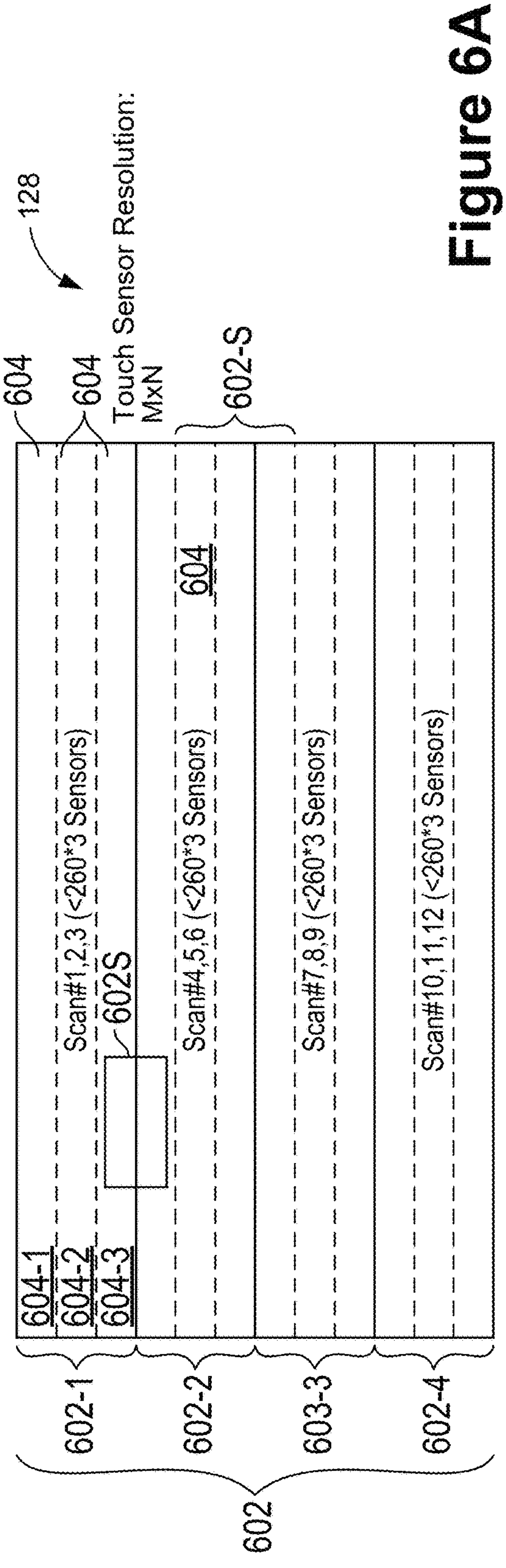
FIG. 6A is a block diagram of an example capacitive sense array including a plurality of sensor blocks, in accordance with some embodiments.

FIG. 6A is a block diagram of an example capacitive sense array 128 including a plurality of sensor blocks 602, in accordance with some embodiments. The capacitive sense array 128 includes M rows and N columns of capacitive sensor elements 224, where M and N are two integers. The plurality of sensor blocks 602 are arranged in a column. Each sensor block 602 includes a plurality of rows of capacitive sensor elements each of which includes all N capacitive sensor elements in the respective row. In some embodiments, each sensor block 602 further includes a plurality of sensor bands 604. For example, referring to FIG. 6A, the capacitive sense array 128 includes four sensor blocks 602-1, 602-2, 602-3, and 602-4, and each sensor block 602 (e.g., block 602-1) further includes three sensor bands 604 (e.g., bands 604-1, 604-2, and 604-3).

In some embodiments, a block multiplexer is configured to select one of the plurality of sensor blocks 602 to be at least partially scanned for touch sensing. In some embodiments, each sensor block 602 corresponds to a respective band multiplexer configured to select one of the plurality of sensor bands 604 to be at least partially scanned for touch sensing. Internal touch control signals and a touch clock signal are generated to control a touch AFE 332 of a TSD 206 to measure touch sense data from capacitive sensor elements 224 of the selected sensor band 604. In some situations, two or more sensor bands 604 of a selected sensor block 602 may be successively selected and scanned for touch sensing. Further, in some situations, two or more sensor blocks 604 may be selected and scanned to allow associated sensor bands 604 of each sensor block 602 to be successively selected and scanned. In some embodiments, each column of capacitive sensor elements 224 correspond to a plurality of band multiplexers of a plurality of sensor blocks 602 and a touch AFE 332, and capacitive sensor elements 224 are scanned using the band multiplexers and the touch AFE 332 of each column concurrently in a synchronous manner.

Figure 6B:
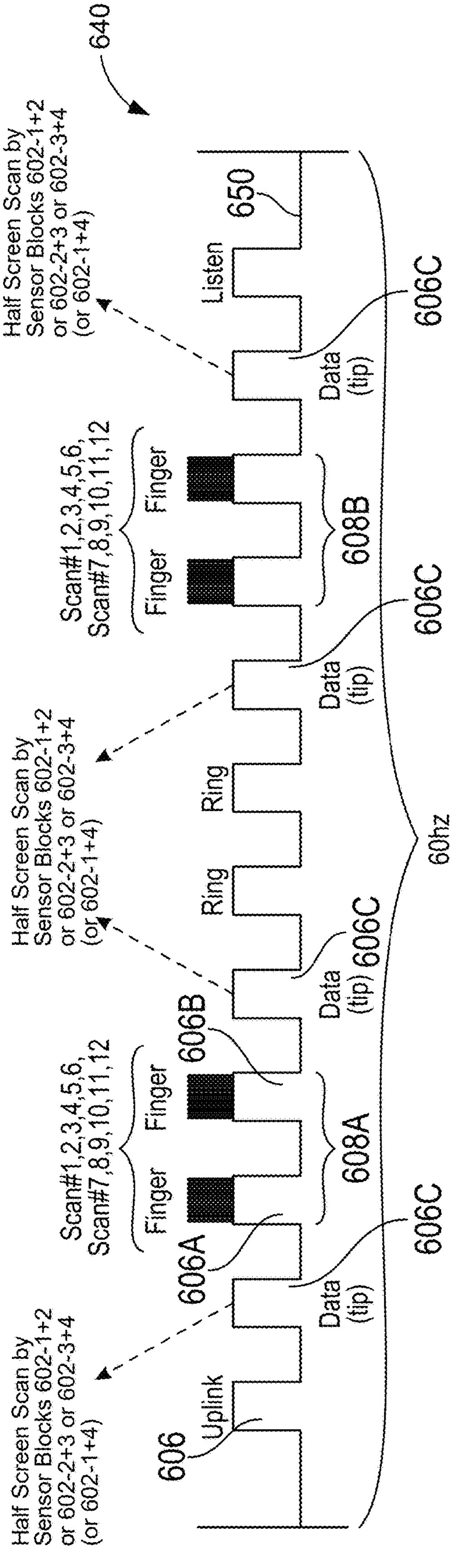
FIG. 6B is a temporal diagram of an example touch scheme of a capacitive sense array, in accordance with some embodiments.

FIG. 6B is a temporal diagram of an example touch scheme 640 of a capacitive sense array 128, in accordance with some embodiments. Display driving, touch sensing, or both are implemented during duty cycles 606 of a clock signal 650 corresponding to a first logic value, e.g., when the clock signal 650 has a high voltage level corresponding to "1". In some embodiments, during one or more successive duty cycles 606 of the clock signal 650, the plurality of sensor bands 604 of the plurality of sensor blocks 602 of the capacitive sense array 128 are successively scanned according to a predefined order, e.g., to detect a finger touch event. For example, the capacitive sense array 128 has four sensor blocks 602 and twelve sensor bands 604 in total. The twelve sensor bands 604 are scanned successively in two successive duty cycles 606A and 606B of the clock signal 650. In an example, the clock signal 650 has a frequency of 60 Hz, and every six clock cycles include two successive duty cycles 606A and 606B in which the twelve sensor bands 604 are fully scanned, e.g., at a frequency of 10 Hz.

In some embodiments, in a duty cycle 606, a subset of sensor blocks 602S (e.g., sensor blocks 602-1 and 602-2 or a portion thereof) is selected from the plurality of sensor blocks 602 for touch sensing. For instance, two immediately adjacent sensor blocks 602 are selected from four sensor blocks 602, and half a screen may be selected and scanned for touch sensing. Further, in some embodiments, the two immediately adjacent sensor blocks 602 (e.g., blocks 602-1 and 602-2, blocks 602-2 and 602-3, and blocks 602-3 and 602-4) are selected concurrently during a duty cycle 606C. Conversely, in some embodiments, two sensor blocks 602 (e.g., blocks 602-1 and 602-4, blocks 602-1 and 602-3, blocks 602-2 and 602-4) are not immediately adjacent to each other, and selected from four sensor blocks 602 for touch sensing.

In some embodiments, the duty cycle 606C follows the duty cycles 606A and 606B. After a full scan 608A of the sensor bands 604, a touch event is identified in a touch location associated with the display device 125. A portion of the capacitive sense array 128 includes the touch location of the touch event, and corresponds to the subset of sensor blocks 602S. The subset of sensor blocks 602S are selectively scanned to update capacitive sense signals associated with the touch event in one or more duty cycles 606C in a targeted manner, before another full scan 608B of the sensor bands 604 is executed.

Figure 7:
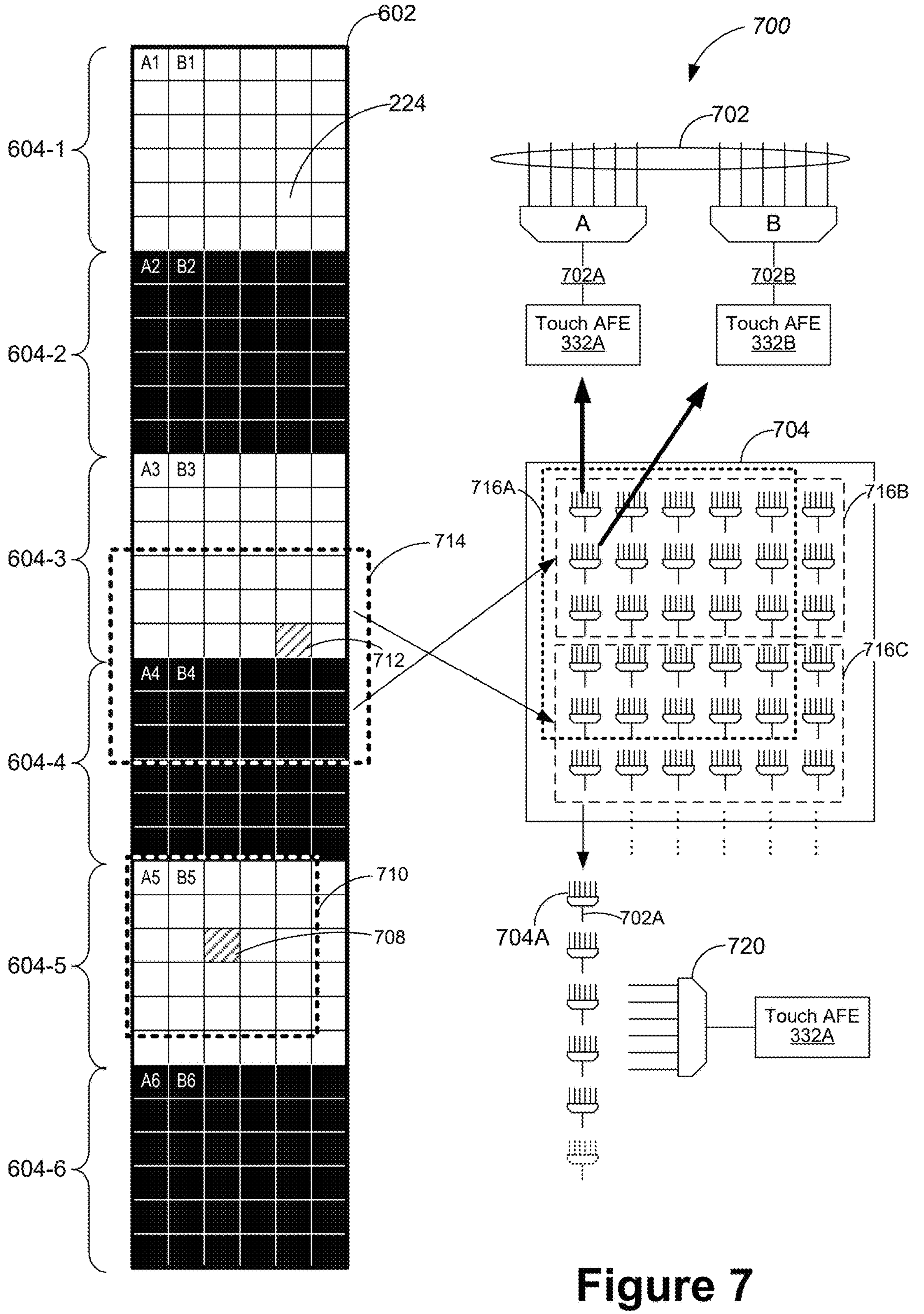
FIG. 7 is a block diagram of an example touch sensing system including a sensor block coupled to a band multiplexer, in accordance with some embodiments.

FIG. 7 is a block diagram of an example touch sensing system 700 including a sensor block 602 coupled to a band multiplexer 720, in accordance with some embodiments. The touch sensing system 700 includes a capacitive sense array 128 having a plurality of sensor blocks 602 (e.g., sensor block 602 in FIG. 6). The sensor block 602 further includes a plurality of sensor bands 604 (e.g., sensor bands 604-1, 604-2, 604-3, 604-4, and 604-5), and each sensor band 604 includes a plurality of rows of capacitive sensor elements 224 (also called capacitive sensor elements 224). Each row of capacitive sensor elements 224 may have a first number of capacitive sensor elements, and the capacitive sense array 128 has a number of columns of capacitive sensor elements 224. The number of columns is equal to the first number, i.e., each row of capacitive sensor elements 224 may include all capacitive sensor elements in a corresponding row of the capacitive sense array 128. In some embodiments, each sensor band 604 has a band height corresponding to a number of rows that the plurality of rows of capacitive sensor elements 224 have.

In some embodiments, the plurality of sensor bands 604 includes a first sensor band 604-1 and a set of one or more remaining sensor bands 604-2 to 604-6. A first capacitive sensor element A1 of the first sensor band 604-1 corresponds to a respective capacitive sensor element A2, A3, A4, A5, or A6 in each remaining sensor band 604-2, 604-3, 604-4, 604-5, or 604-6. In some embodiments, the band multiplexer 720 is configured to select a subset of capacitive sensor elements 604S by way of a subset of internal multiplexer 704 to be measured sequentially by a touch AFE 332 of a TSD 206. The band multiplexer 720 is coupled to a plurality of internal multiplexer 704 (e.g., a first internal multiplexer 704A), and each internal multiplexer 704 is configured to select one of a set of respective capacitive sensor elements 224 of distinct sensor bands 604 to be measured by a respective touch AFE 332. For example, the first capacitive sensor element A1 and the respective capacitive sensor elements A2-A6 in the set of one or more remaining sensor bands 604-2 to 604-6 are coupled to the first internal multiplexer 704A, which is configured to select one of the first capacitive sensor element A1 and the respective capacitive sensor elements A2-A6 to output a first capacitive sensing signal 702A. A second capacitive sensor element B1 of the first sensor band 604-1 and the respective capacitive sensor elements B2-B6 in the set of one or more remaining sensor bands 604-2 to 604-6 are coupled to a second internal multiplexer 704B, which is configured to select one of the second capacitive sensor element B1 and the respective capacitive sensor elements B2-B6 to output a second capacitive sensing signal 702B.

Further, in some embodiments, a first set of capacitive sensor elements A1-A6 shares a first touch AFE 332A in a time-multiplexed manner, and the first internal multiplexer 704A successively selects one of the first set of capacitive sensor elements A1-A6 to be coupled to a first touch AFE 332A, thereby allowing the capacitive sensor elements A1-A6 to scanned by the first touch AFE 332A. A second set of capacitive sensor elements B1-B6 shares a second touch AFE 332B in a time-multiplexed manner, and the second internal multiplexer 704B successively selects one of the second set of capacitive sensor elements B1-B6 to be coupled to the second touch AFE 332B, thereby allowing the capacitive sensor elements B1-B6 to scanned by the second touch AFE 332B.

In some embodiments, each column of capacitive sensor elements 224 correspond to a plurality of band multiplexers 720 of a plurality of sensor blocks 602 and a touch AFE 332, and capacitive sensor elements 224 of the column are scanned using the band multiplexers 720 and the touch AFE 332 in synchronization with capacitive sensor elements 224 of other columns. For a column (e.g., where element A1 is located), each sensor block 602 corresponds to a respective band multiplexer 720 selecting one of a set of internal multiplexers (e.g., a column of six internal multiplexer in FIG. 7) to provide a capacitive sensing signal 700 at a time.

In some embodiments, the band multiplexer 720 is coupled to a number of internal multiplexers 704, and each sensor band 604 includes a number of capacitive sensor elements 224. The number of internal multiplexers 704 is equal to the number of capacitive sensor elements 224. Stated another way, each internal multiplexer 704 is configured to scan a distinct set of capacitive sensor elements of the plurality of sensor bands 604 of the sensor block 602. Further, in some embodiments, the internal multiplexers 704 coupled to the band multiplexer 720 are synchronized to output capacitive sensing signals 702 corresponding to the capacitive sensor elements 224 of the same sensor band 604 (e.g., elements A5, B5, and . . . of the sensor band 604-5) during a duty cycle. In some situations, a touch event is detected at a location 708 at or near a middle row of the sensor band 604-5 (e.g., not near an edge of the sensor band 604-5), and capacitive sensor elements 224 of the same sensor band 604 are located in a touch region 710 enclosing the touch location 708 of the touch event. The capacitive sensor elements 224 in the touch region 710 may be located within the sensor band 604-5, and selected by a set of internal multiplexer 716A for touch sensing subsequent to the touch event (e.g., for an extended temporal duration). Outputs of the set of internal multiplexers 716A are selected and outputted by a set of band multiplexers 720 sequentially. Further, in some embodiments not shown, the touch region 710 has the same size of the entire sensor band 604 (e.g., the sensor band 604-5).

In some embodiments, a touch event is detected at a location 712 at or near a boundary of two immediately adjacent sensor bands 604-3 and 604-4, and a touch region 714 encloses the touch location 712 of the touch event. The capacitive sensor elements 224 in the touch region 714 may be selected by the internal multiplexers 704 for touch sensing subsequent to the touch event, and includes a subset of the sensor band 604-3 and a subset of the sensor band 604-4. Further, in some embodiments, the touch region 714 has a size of the sensor band 604. For example, a height of the touch region 714 (e.g., 6 rows) is defined based on a band height of the sensor bands 604. Outputs of all of the internal multiplexers 704 are selected and outputted by a set of band multiplexers 720 sequentially. Alternatively, in some embodiments not shown, the touch region 714 is smaller than each sensor band 604 in size. A subset (e.g., less than all) of the internal multiplexers 704 are enabled, and have outputs selected and outputted by a subset of band multiplexers 720 sequentially.

Figure 8A:
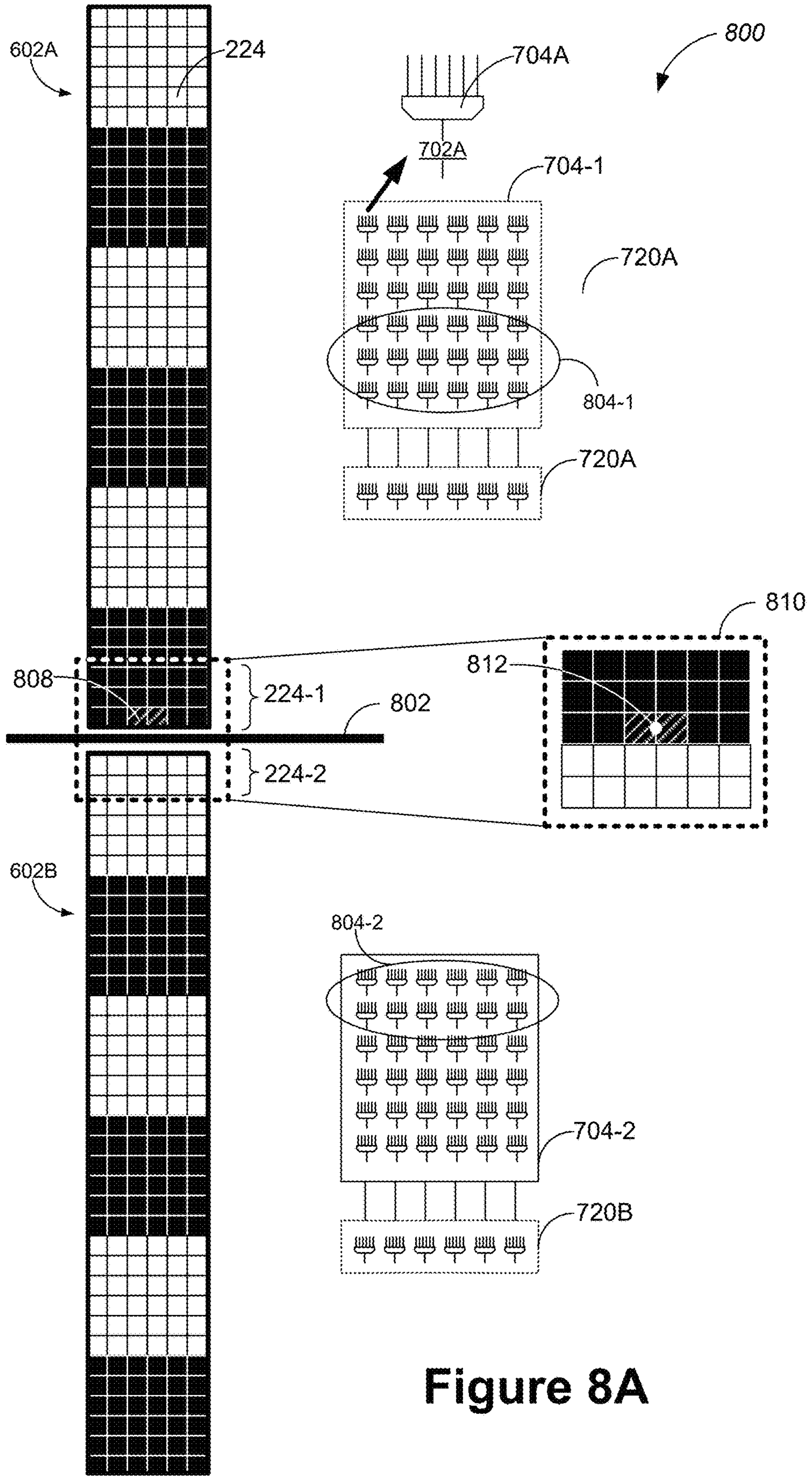
FIG. 8A is a block diagram of an example touch sensing system including at least two sensor blocks and, in accordance with some embodiments.
Figure 8B:
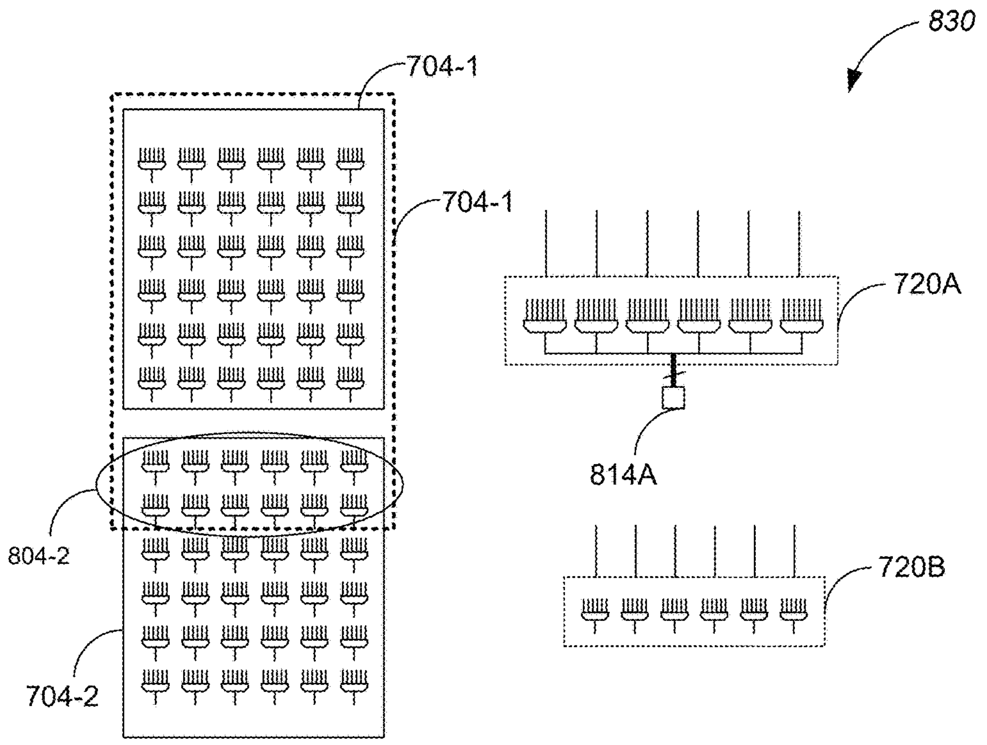
FIGS. 8B and 8C are two example multiplexing schemes and for scanning a touch region partially overlapping two neighboring sensor blocks and shown in FIG. 8A, in accordance with some embodiments.
Figure 8C:
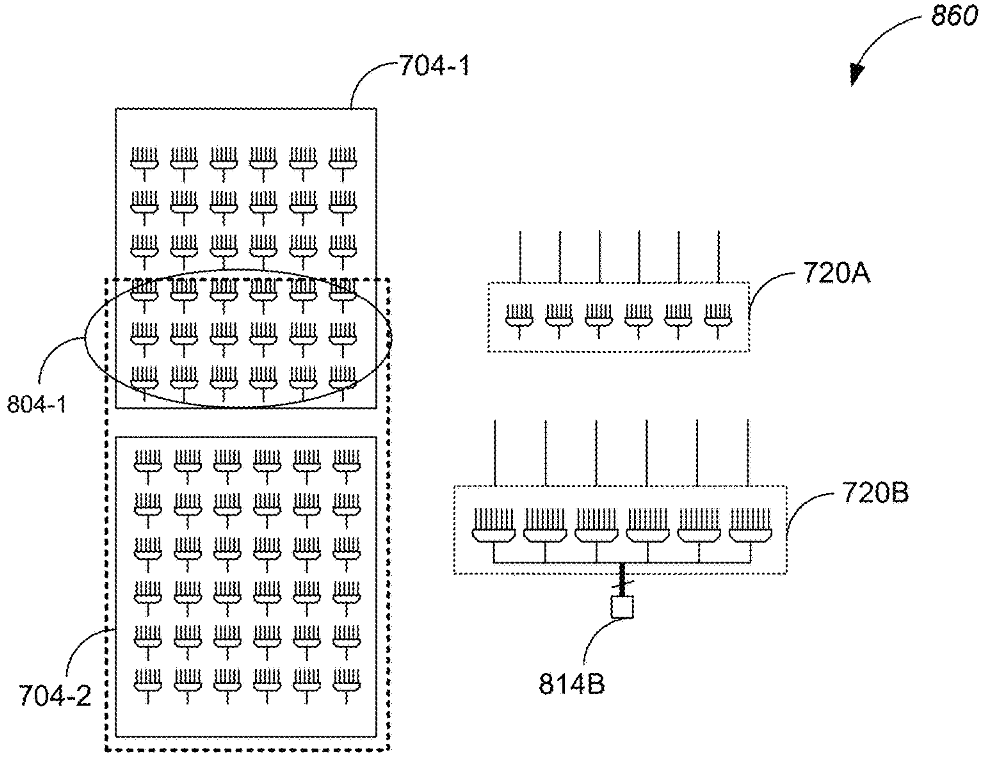

FIG. 8A is a block diagram of an example touch sensing system 800 including at least two sensor blocks 602A and 602B, in accordance with some embodiments. FIGS. 8B and 8C are two example multiplexing schemes 830 and 860 for scanning a touch region 810 partially overlapping two neighboring sensor blocks 602A and 602B shown in FIG. 8A, in accordance with some embodiments. The touch sensing system 800 further include a touch display panel 125 and a plurality of band multiplexers 720 (e.g., multiplexers 720A and 720B). The touch display panel 125 includes a capacitive sense array 128 having a plurality of capacitive sensor elements 224. In some embodiments, the plurality of capacitive sensor elements 224 are grouped into a plurality of sensor blocks 602, and each sensor blocks 602 further includes a plurality of sensor bands 604. Further, in some embodiments, all sensor bands 604 of the capacitive sense array 128 are arranged into a single column of sensor bands 604. Each set of band multiplexers 720 (e.g., 720A and 720B) may correspond to a respective sensor block 602 (e.g., 602A and 602B) and be coupled to a plurality of internal multiplexers 704. Each of the plurality of internal multiplexer 704 corresponds to a set of capacitive sensor elements 224, which may be distributed in the plurality of sensor bands 604 of the respective sensor block 602 and located at the same location of the plurality of sensor bands 604.

In some embodiments, each sensor band 604 has a resolution of A×B capacitive sensor elements 224, and the plurality of internal multiplexers 704 include A×B internal multiplexers. Each internal multiplexer 704 corresponds to a respective capacitive sensor element 224 located in a respective location of each sensor band 604. The set of band multiplexers 720 includes a row of B band multiplexers 720, and each band multiplexer 720 is configured to scan the capacitive sensor elements 224 in a respective column via a set of A internal multiplexers 704.

In some embodiments, a first sensor block 602A and a second sensor block 602B are immediately adjacent to one another. For example, a last row of capacitive sensor elements of the first sensor block 602A is immediately adjacent to, and separated by a boundary 802 from, a top row of capacitive sensor elements of the second sensor block 602B. A plurality of capacitive sensing signals 702 measured from the capacitive sense array 128, e.g., from individual capacitive sensor elements 224 and by way of an output of an internal multiplexer 704 or an output of a band multiplexer 720. A touch event is detected at a touch location 808 in the first sensor block 602A based on the plurality of capacitive sensing signals 702. In some embodiments, the touch location 808 is adjacent to the boundary 802 between the sensor blocks 602A and 602B. A touch region 810 is determined based on the touch location 808, and includes a first set of capacitive sensor elements 224-1 in the first sensor block 602A and a second set of capacitive sensor elements 224-2 in the second sensor block 602B. The touch region 810 including the first set of capacitive sensor elements 224-1 and the second set of capacitive sensor elements 224-2 is scanned, e.g., in a scan cycle and to track the touch location 808. In some embodiments, after the touch region 810 is scanned, the capacitive sensing signals 702 associated with the capacitive sensor elements 224-1 and 224-2 are updated, so is the touch location 808 of the touch event.

In some embodiments, the touch region 810 has a region center 812 and is symmetric with respect to the region center 812, and the detected touch location 808 overlaps the region center 812. The touch location 808 corresponds to a subset of one or more capacitive sensor elements (e.g., two capacitive sensor elements filled with a slash pattern) overlapping the region center 812. Alternatively, in some embodiments, the detected touch location 808 does not overlap the region center, and a distance between the touch location 808 and the region center is less than a predefined distance (e.g., 20 μm). Alternatively, in some embodiments, a distance between the touch location 808 and the region center is determined based on a touch moving rate, the touch location 808, and a scan refresh rate. The touch moving rate may be determined based on the touch location 808 or one or more previous touch locations.

In some embodiments, the touch region 810 has a region size that is equal to a band size of each sensor band 604. Alternatively, in some embodiments, the touch region 810 has a region width that is equal to a band width of each sensor band 604 and a region height that is lower than a band height of each sensor band 604. Alternatively, in some embodiments, the touch region 810 has a region width that is narrower than a band width of each sensor band 604 and a region height that is equal to a band height of each sensor band 604. Alternatively, in some embodiments, the touch region 810 has a region width that is narrower than a band width of each sensor band 604 and a region height that is lower than a band height of each sensor band 604. In an example, the touch region 810 has a square shape corresponding to a predefined first number K1 of rows capacitive sensor elements 224 and a predefined second number K2 of columns of capacitive sensor elements 224, and the predefined first number K1 equal to the predefined second number K2.

In some embodiments, the touch region 810 includes a predefined number (K) of rows of capacitive sensor elements, and the touch location 808 is on an M-th row, where M is equal to K/2, when K is an even integer, or (K+1)/2, when K is an odd integer. Referring to FIG. 8A, in this example, K is equal to 5, and the touch location 808 is located on the third row.

In some embodiments, each of the sensor blocks 602 (e.g., 602A, 602B) of the touch sensing system 800 corresponds to a set of respective band multiplexers 720 via which capacitive sensor elements 224 of the respective sensor block 602 are selected to provide respective capacitive sensing signals 702. The first set of capacitive sensor elements 224-1 may be located on one or more bottom rows of the first sensor block 602A. The second set of capacitive sensor elements 224-2 may be located on one or more top rows of the first sensor block 602B. Specifically, in some embodiments, when the capacitive sensor elements 224 of the respective sensor block 602 are scanned, the capacitive sensor elements 224 may be selected by respective internal multiplexers 704 and the respective band multiplexer 720 to provide respective capacitive sense signals 702 during their respective time slots. In an example, a sensor band 604 of a sensor block 602A is selected to output via the internal multiplexers 704-1, and outputs of a subset or all of the internal multiplexers 704-1 (e.g., corresponding to the touch region 710 or 714 in FIG. 7) are sequentially selected to output via the set of band multiplexers 720A, allowing associated capacitive sensor elements 224 of the sensor block 602A to be scanned (e.g., outputted row-by-row via the set of band multiplexers 720A).

In some embodiments, when the touch region 810 is scanned, the first set of capacitive sensor elements 224-1 of the first sensor block 602A is selected via a first set of internal multiplexers 804-1 coupled to a first band multiplexer 720A, and the second set of capacitive sensor elements 224-2 of the second sensor block 602B is selected via a second set of internal multiplexers 804-2 coupled to a second band multiplexer 720B. Further, in some embodiments, both the first set of internal multiplexer 804-1 and the second set of internal multiplexers 804-2 are coupled to a set of band multiplexers 720 of one of the first sensor block 602A and the second sensor block 602B. Stated another way, the touch region 810 is scanned via the band multiplexers 720A or 720B (not both). Capacitive sense signals 702 of the first set of capacitive sensor elements 224-1 and the second set of capacitive sensor elements 224-2 are sequentially outputted via outputs of the band multiplexers 720 of the one of the first sensor block 602A and the second sensor block 602B.

Referring to FIG. 8B, in some embodiments, the capacitive sense signals 702 of the first set of capacitive sensor elements 224-1 and the second set of capacitive sensor elements 224-2 are sequentially outputted via outputs of the band multiplexers 720A. The band multiplexers 720A of the first sensor block 602A are coupled to the plurality of internal multiplexer 704-1 of the first sensor block 602A, and further coupled to the second set of internal multiplexers 804-2 of the second sensor block. Only the band multiplexers are needed to scan the touch region 810 shown in FIG. 8A. The respective multiplexers 720A of the first sensor block 602A are expanded to select the second set of capacitive sensor elements 224-1. Stated another way, the second set of capacitive sensor elements 224-2 may be scanned using both of the band multiplexers 720A and 720B. In some embodiments, while the band multiplexers 720A of the first sensor block 602A are enabled, the first set of capacitive sensor elements 224-1 and the second set of capacitive sensor elements 224-2 are successively selected, e.g., by way of their respective internal multiplexers 704, to output respective capacitive sensing signals 702 via output ports 814A of the band multiplexers 720A of the first sensor block 602A.

Alternatively, referring to FIG. 8C, in some embodiments, the capacitive sense signals 702 of the first set of capacitive sensor elements 224-1 and the second set of capacitive sensor elements 224-2 are sequentially outputted via outputs of the set of band multiplexers 720B. The band multiplexers 720B of the second sensor block 602B are coupled to the plurality of internal multiplexer 704-2 of the second sensor block 602B, and further coupled to the first set of internal multiplexers 804-2 of the first sensor block 602A. Only the band multiplexers 720B are needed to scan the touch region 810 shown in FIG. 8A. The band multiplexers 720B of the second sensor block 602B are expanded to select the first set of capacitive sensor elements 224-1 in the first sensor block 602A. Stated another way, the first set of capacitive sensor elements 224-1 may be scanned using both of the band multiplexers 720A and 720B. In some embodiments, while the band multiplexers 720B of the second sensor block 602B are enabled, the first set of capacitive sensor elements 224-1 and the second set of capacitive sensor elements 224-2 are successively selected, e.g., by way of their respective internal multiplexers 704, to output respective capacitive sensing signals 702 via output ports 814B of the band multiplexers 720B of the second sensor block 602B.

Figure 9:
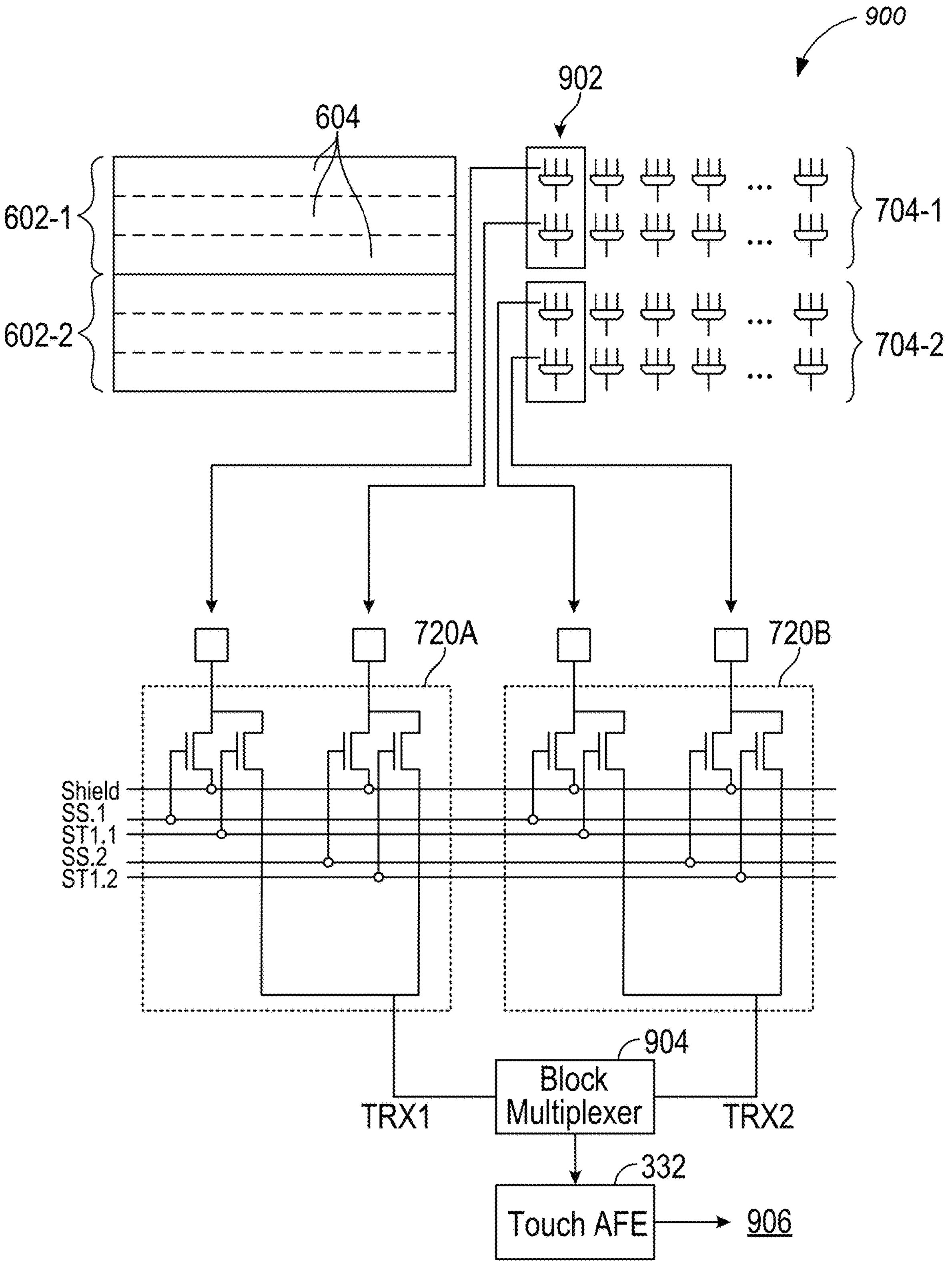
FIG. 9 is a block diagram of an example touch sensing system includes two sensor blocks each of which has three respective sensor bands, in accordance with some embodiments.

FIG. 9 is a block diagram of an example touch sensing system 900 includes two sensor blocks 602 each of which has three respective sensor bands 604, in accordance with some embodiments. Each sensor block 602 is coupled to a plurality of internal multiplexers 704. Each sensor band 604 includes two rows of capacitive sensor elements 224, and is coupled to two rows of internal multiplexers 704. For a sensor block 602-1, each internal multiplexer 704-1 is configured to select one of a set of respective capacitive sensor elements 224 of three distinct sensor bands 604 of the sensor block 602-1. The internal multiplexers 704-1 located on a column 902 are coupled to a respective touch AFE 332 via a band multiplexer 720A and a block multiplexer 904, so that the selected capacitive sensor element 224 may be coupled to, and measured by, the touch AFE 332.

Referring to FIG. 9, the two internal multiplexer 704-1 located on the column 902 are both coupled to the band multiplexer 720A, and the band multiplexer 720A is configured to select individual internal multiplexers 704-1 of the sensor block 602-1 in the same column 902 to be coupled to a respective touch AFE 332, e.g., one at a time, allowing a subset or all of the capacitive sensor elements 224 of the sensor block 602-1 corresponding to the same column 902 to be scanned successively. The band multiplexer 720B is configured to select individual internal multiplexers 704-2 of the sensor block 602-2 in the same column 902 to be coupled to the respective touch AFE 332, e.g., one at a time, allowing a subset or all of the capacitive sensor elements 224 of the sensor block 602-1 in the same column 902 to be scanned successively. Further, in some embodiments, the band multiplexers 720A and 720B of the two sensor blocks 602-1 and 602-2 are further coupled to the block multiplexer 904, and outputs of the band multiplexers 720A and 720B may be selectively outputted to the respective touch AFE 332 via the block multiplexer 904. Under some circumstances, all capacitive sensor elements 224 located in the column 902 of senso blocks 602 may be scanned successively by the touch AFE 332 to generate a capacitive sense signal 906 integrating their associated capacitive sense signals 702 in a time-multiplexed manner.

Figure 10:
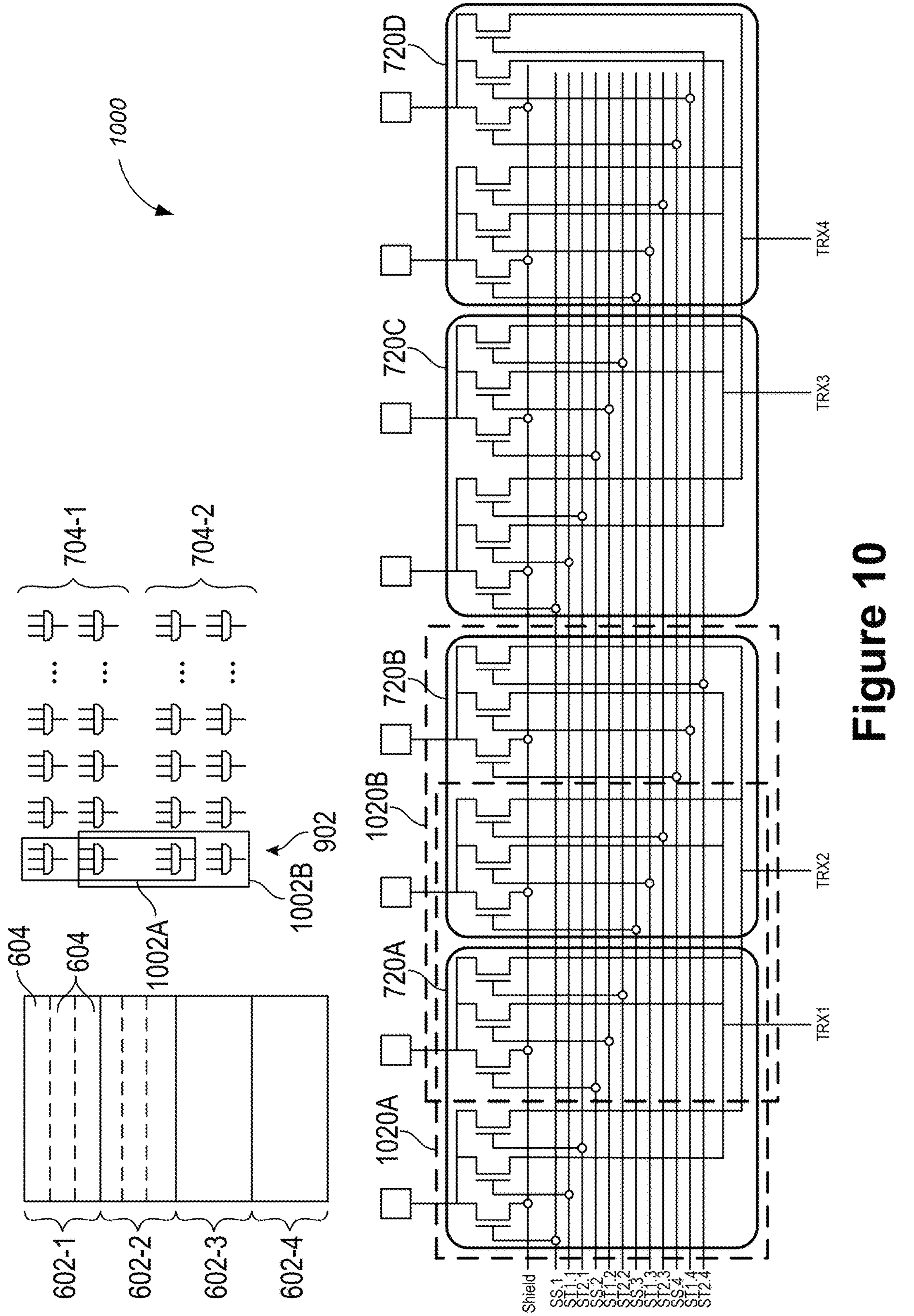
FIG. 10 is a block diagram of an example touch sensing system includes four sensor blocks each of which has three respective sensor bands, in accordance with some embodiments.

FIG. 10 is a block diagram of an example touch sensing system 1000 includes four sensor blocks 602 each of which has three respective sensor bands 604, in accordance with some embodiments. The four sensor blocks 602 include at least a first sensor block 602-1 and a second sensor block 602-2. Each sensor block 602 is coupled to a plurality of internal multiplexers 704. Each sensor band 604 includes two rows of capacitive sensor elements 224, and is coupled to two rows of internal multiplexers 704. For each sensor block 602 (e.g., block 602-1 or 602-2), internal multiplexers 704 (e.g., multiplexers 704-1, 704-2) located on a column 902 are coupled to a respective touch AFE 332 via a band multiplexer 720 (e.g., multiplexer 720A, 720B) and a block multiplexer 904 (FIG. 9), so that the selected capacitive sensor element 224 located on the column 902 may be coupled to, and measured by, the touch AFE 332 in a time-multiplexed manner.

In some embodiments, the internal multiplexers 704 of the sensor blocks 602-1 and 602-2 on the column 902 are coupled to the touch AFE 332 without expanding the band multiplexers 720A and 720B. More details on operations of scanning capacitive sensor elements 224 of the sensor blocks 602-1 corresponding to the column 902 are explained above with reference to FIG. 9. The capacitive sensor elements 224 of a touch sensing system 1000 including the four sensor blocks 602 (FIG. 10) may be implemented using four band multiplexers 720.

Referring to FIG. 10, in some embodiments, the band multiplexer 720A is modified to a band multiplexer 1020A. Three internal multiplexers 1002A located on the column 902 are coupled to the band multiplexer 1020A. The three internal multiplexers 1002A includes two internal multiplexers corresponding to the first sensor block 602-1, and one internal multiplexer corresponding to the second sensor block 602-2. The band multiplexer 1020A is configured to select the sensor block 602-1 and a subset of the sensor block 602-2 in the same column 902 to be coupled to a respective touch AFE 332. As such, when the band multiplexer 1020A is enabled, the capacitive sensor elements 224 of the column 902 scanned by the respective touch AFE 332 covers those in the first sensor block 602-1, and expands to at least the first row of capacitive sensor elements 224 of the second sensor block 602-2.

In some embodiments not shown, the band multiplexer 720A is expanded, such that the band multiplexer 1020A is configured to receive all four outputs of the four internal multiplexers of the sensor blocks 602-1 and 602-2 on the column 902. When the band multiplexer 1020A is enabled, the capacitive sensor elements 224 of the column 902 scanned by the respective touch AFE 332 covers those in both the first sensor block 602-1 and the second sensor block 602-2.

Referring to FIG. 10, in some embodiments, the band multiplexer 720B is modified to a band multiplexer 1020B. Three internal multiplexers 1002B located on the column 902 are coupled to the band multiplexer 1020B. The three internal multiplexers 1002B includes two internal multiplexers corresponding to the second sensor block 602-2, and one internal multiplexer corresponding to the first sensor block 602-1. The band multiplexer 1020B is configured to select the sensor block 602-2 and a subset of the sensor block 602-1 in the same column 902 to be coupled to a respective touch AFE 332. As such, when the band multiplexer 1020B is enabled, the capacitive sensor elements 224 of the column 902 scanned by the respective touch AFE 332 covers those in the second sensor block 602-2, and expands to at least the last row of capacitive sensor elements 224 of the first sensor block 602-1.

In some embodiments not shown, the band multiplexer 720B is expanded, such that the band multiplexer 1020B is configured to receive all four outputs of the four internal multiplexers of the sensor blocks 602-1 and 602-2 on the column 902. When the band multiplexer 1020A is enabled, the capacitive sensor elements 224 of the column 902 scanned by the respective touch AFE 332 covers those in both the first sensor block 602-1 and the second sensor block 602-2.

In some embodiments not shown, the band multiplexer 720B is expanded, such that the band multiplexer 1020B is configured to receive all four outputs of the four internal multiplexers of the sensor blocks 602-1 and 602-2 on the column 902. When the band multiplexer 1020A is enabled, the capacitive sensor elements 224 of the column 902 scanned by the respective touch AFE 332 covers those in both the first sensor block 602-1 and the second sensor block 602-2.

In some embodiments not shown, the internal multiplexers 1002B are coupled to the band multiplexer 1020B on the column 902, and include two internal multiplexers corresponding to the second sensor block 602-2, and an internal multiplexer corresponding to a third sensor block 602-3. When the band multiplexer 1020B is enabled, the capacitive sensor elements 224 of the column 902 scanned by the respective touch AFE 332 covers those in the second sensor block 602-2, and expands to at least the first row of capacitive sensor elements 224 of the third sensor block 602-3.

In some embodiments not shown, the internal multiplexers 1002B are coupled to the band multiplexer 1020B on the column 902, and include two internal multiplexers corresponding to the second sensor block 602-2, an internal multiplexer corresponding to a first sensor block 602-1, and an internal multiplexer corresponding to a third sensor block 602-3. When the band multiplexer 1020B is enabled, the capacitive sensor elements 224 of the column 902 scanned by the respective touch AFE 332 covers those in the second sensor block 602-2, and may expand flexibly to the first row of capacitive sensor elements 224 of the third sensor block 602-3 or a last row of capacitive sensor elements 224 of the first sensor block 602-1 based on a touch location of a touch event.

It is noted that the embodiments described above with reference to FIGS. 9 and 10 are simplified. In some embodiments, each sensor band 604 includes a first number (M) of rows of capacitive sensor elements 224 and is coupled to the same number (M) of rows of internal multiplexers 704. M may be equal to two or more than two. A band multiplexer 720 of each sensor band 604 may be expanded to couple to a second number (N) of internal multiplexers 704 on a neighboring sensor band located immediately above the respective sensor band 604, a neighboring sensor band located immediately below the respective sensor band 604, or both of them. N may be equal to 1 or any other integer number that is not greater than M. Referring to FIG. 10, in this example, M is equal to 2, and N is equal to 1. In some embodiments, when the band multiplexer 720 is expanded, the band multiplexer 720 is redesigned to include additional input ports and transistors, and the input ports are electrically coupled to output ports of the internal multiplexer 704 of one or both of two neighboring sensor blocks 602 of the same touch display panel.

Figure 11:
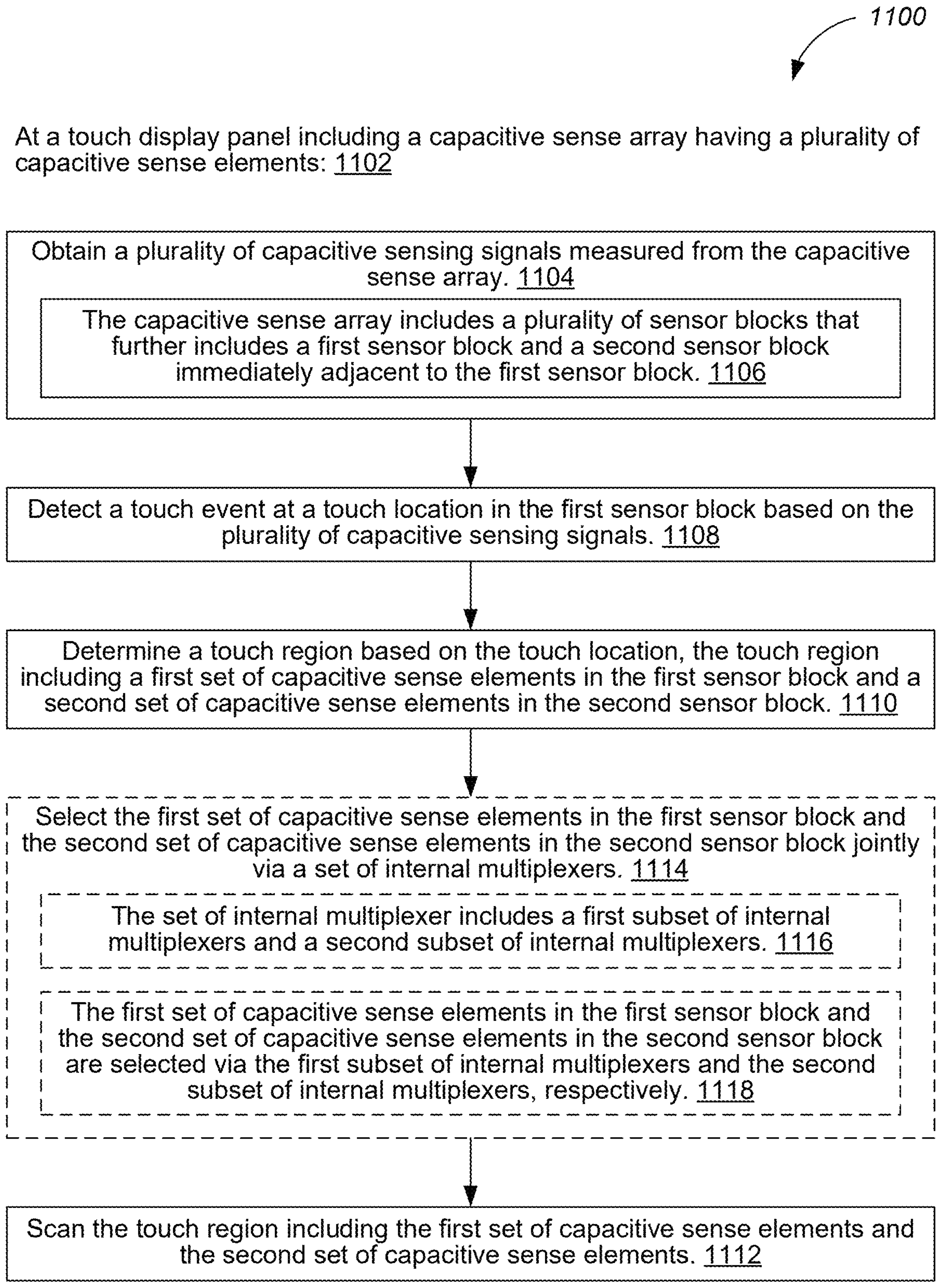
FIG. 11 is a flow diagram of an example method for detecting touch on a touch display device, in accordance with some embodiments.

FIG. 11 is a flow diagram of an example method 1100 for detecting touch on a touch display device, in accordance with some embodiments. The method 1100 is implemented (operation 1102) at an electronic system 100 (e.g., a touch display device) including a touch display panel 125. The touch display panel includes a capacitive sense array 128 having a plurality of capacitive sensor elements 224. In some embodiments, an electronic system 100 includes a controller and memory storing instructions to be executed by the controller for implementing operations of the method 1100. In some embodiments, an electronic system 100 includes a processing device 110 coupled to the capacitive sense array 128. The electronic system 100 obtains (operation 1104) a plurality of capacitive sensing signals 702 measured from the capacitive sense array 128. The capacitive sense array 128 includes (operation 1106) a plurality of sensor blocks 602 that further includes a first sensor block 602-1 and a second sensor block 602-2 immediately adjacent to the first sensor block 602-1. The electronic system 100 detects (operation 1108) a touch event at a touch location (e.g., 708 and 712 in FIG. 7, 808 in FIG. 8A) in the first sensor block 602-1 based on the plurality of capacitive sensing signals 702 702, and determines (operation 1110) a touch region (e.g., 708 and 714 in FIG. 7, 810 in FIG. 8A) based on the touch location. The touch region includes a first set of capacitive sensor elements 224-1 in the first sensor block 602-1 and a second set of capacitive sensor elements 224-2 in the second sensor block 602-2, and is scanned (operation 1112).

In some embodiments, in accordance with scanning the touch region, the electronic system 100 updates a subset of the plurality of capacitive sensing signals 702 and the touch location of the touch event.

In some embodiments, the first set of capacitive sensor elements 224-1 in the first sensor block 602-1 and the second set of capacitive sensor elements 224-2 in the second sensor block 602-2 are selected (operation 1114) jointly via a set of internal multiplexers 804-1 and 804-2. Further, in some embodiments, the set of internal multiplexers includes (operation 1116) a first subset of internal multiplexers 804-1 and a second subset of internal multiplexers 804-2 (FIGS. 8A-8C), and the first set of capacitive sensor elements 224-1 in the first sensor block 602-1 and the second set of capacitive sensor elements 224-2 in the second sensor block 602-2 are selected (operation 1118) via the first subset of internal multiplexers 804-1 and the second subset of internal multiplexers 804-2, respectively. In some embodiments, the set of internal multiplexers are coupled to a set of band multiplexers 720 (e.g., 720A in FIG. 8B, 720B in FIG. 8C) of one of the first sensor block 602-1 and the second sensor block 602-2. Associated capacitive sense signals 702 of the first set of capacitive sensor elements 224-1 and the second set of capacitive sensor elements 224-2 are sequentially outputted via the set of band multiplexers 720.

In some embodiments, each of the plurality of sensor blocks 602 corresponds to a set of respective band multiplexers 720 via which capacitive sensor elements and internal multiplexers of the respective sensor block is selected to provide respective capacitive sensing signals 702. The first set of capacitive sensor elements 224-1 is located on one or more bottom rows of the first sensor block 602-1. The second set of capacitive sensor elements 224-2 is located on one or more top rows of the first sensor block 602-1. Further, in some embodiments, the set of respective band multiplexers 720B of the second sensor block 602-2 (FIG. 8C) is expanded to select the first set of capacitive sensor elements 224-1 in the first sensor block 602-1. In some embodiments, while the set of respective band multiplexers 720A of the second sensor block 602-2 is enabled, the first set of capacitive sensor elements 224-1 and the second set of capacitive sensor elements 224-2 are successively scanned to output a respective capacitive sensing signal via an output port of each of the set of respective band multiplexers 720B of the second sensor block 602-2. In some embodiments, the set of respective band multiplexers 720A of the first sensor block 602-1 is expanded to select the second set of capacitive sensor elements 224-2. In some embodiments, while the set of respective band multiplexer of the first sensor block 602-1 is enabled, the first set of capacitive sensor elements 224-1 and the second set of capacitive sensor elements 224-2 are successively selected to output a respective capacitive sensing signal via an output port of each of the respective band multiplexers 720A of the first sensor block 602-1.

In some embodiments, each of the plurality of sensor blocks 602 includes a first number of rows of capacitive sensor elements 224.

In some embodiments, the touch region includes a number (K) of rows of capacitive sensor elements 224, and the touch location is on an M-th row, where M is equal to K/2, when K is an even integer, or (K+1)/2, when K is an odd integer.

In some embodiments, the touch region (e.g., touch region 810 in FIG. 8A) is symmetric with respect to a region center 812 (FIG. 8A), and the touch location 808 corresponds to a subset of one or more capacitive sensor elements 224 overlapping the region center 812. Further, in some embodiments, the touch region includes a first number K1 of rows capacitive sensor elements and a second number K2 of columns of capacitive sensor elements, the first number K1 equal to the second number K2.

In some embodiments, each of the plurality of sensor blocks 602 includes a plurality of sensor bands 604. Each sensor band 604 includes a plurality of rows of capacitive sensor elements 224 corresponding to a band height, and the capacitive sense array 128 includes a first number of columns of capacitive sensor elements 224, and each row of the plurality of sensor blocks includes the first number of capacitive sensor elements 224. Further, in some embodiments, a height of the touch region is defined based on the band height. In some embodiments, the first sensor block 602-1 includes a first sensor band 604-1 and a set of one or more remaining sensor bands 604-2 to 604-6 (FIG. 7). A first capacitive sensor element A1 of the first sensor band 604-1 corresponds to a respective capacitive sensor element A2, A3, A4, A5, or A6 in each remaining sensor band. The first capacitive sensor element A1 and the respective capacitive sensor elements A2-A6 in the set of one or more remaining sensor bands 604-2 to 604-6 are coupled to a first internal multiplexer 704A, which is configured to select one of the first capacitive sensor element A1 and the respective capacitive sensor elements A2-A6 to output an associated capacitive sensing signal 702.

It should be understood that the particular order in which the operations in FIG. 11 have been described are merely exemplary and are not intended to indicate that the described order is the only order in which the operations could be performed. One of ordinary skill in the art would recognize various ways to reorder the operations described herein. It should be noted that details of systems, devices, and circuits described with respect to any of FIGS. 1-10 are also applicable in an analogous manner to the method 1100. For brevity, these details are not repeated here.

Certain embodiments are described herein as including logic or a number of components, modules, or mechanisms. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion embodied as executable instructions or code) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to “some embodiments” or “an embodiment” means that a particular element, feature, structure, or characteristic described in connection with the embodiment is included in at least some embodiments. The phrase “in some embodiments” in various places in the specification is not necessarily all referring to the same embodiment.

Some embodiments may be described using the expression “coupled” and “connected” along with their derivatives. For example, some embodiments may be described using the term “coupled” to indicate that two or more elements are in direct physical or electrical contact. The term “coupled,” however, may also mean that two or more elements are not in direct contact with each other, but yet still co-operate or interact with each other. The embodiments are not limited in this context.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the “a” or “an” are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a bi-directional scalable intra-panel interface disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described.

What is claimed is:

1. A method, comprising:

at a touch display panel including a capacitive sense array having a plurality of touch sensors:

obtaining a plurality of capacitive sensing signals measured from the capacitive sense array, wherein the capacitive sense array includes a plurality of sensor blocks that further includes a first sensor block and a second sensor block immediately adjacent to the first sensor block;

detecting a touch event at a touch location in the first sensor block based on the plurality of capacitive sensing signals;

determining a touch region based on the touch location, the touch region including a first set of touch sensors in the first sensor block and a second set of touch sensors in the second sensor block; and scanning the touch region including the first set of touch sensors and the second set of touch sensors, further including selecting the first set of touch sensors in the first sensor block and the second set of touch sensors in the second sensor block jointly via a set of internal multiplexers, wherein the set of internal multiplexer includes a first subset of internal multiplexers and a second subset of internal multiplexers, and the first set of touch sensors in the first sensor block and the second set of touch sensors in the second sensor block are selected via the first subset of internal multiplexers and the second subset of internal multiplexers, respectively.

2. The method of claim 1, further comprising:

in accordance with scanning the touch region, updating a subset of the plurality of capacitive sensing signals and the touch location of the touch event.

3. The method of claim 1, wherein the set of internal multiplexers are coupled to a set of band multiplexers of one of the first sensor block and the second sensor block, the method further comprising:

sequentially outputting associated capacitive sense signals of the first set of touch sensors and the second set of touch sensors via the set of band multiplexers.

4. The method of claim 1, wherein:

each of the plurality of sensor blocks corresponds to a respective band multiplexer via which touch sensors and internal multiplexers of the respective sensor block are selected to provide respective capacitive sensing signals;

the first set of touch sensors is located on one or more bottom rows of the first sensor block; and the second set of touch sensors is located on one or more top rows of the second sensor block.

5. The method of claim 4, wherein the respective band multiplexer of the second sensor block is expanded to select the first set of touch sensors in the first sensor block.

6. The method of claim 4, scanning the touch region further comprising:

while enabling the respective band multiplexer of the second sensor block, successively selecting the first set of touch sensors and the second set of touch sensors to output a respective capacitive sensing signal via an output port of the respective band multiplexer of the second sensor block.

7. The method of claim 4, wherein the respective band multiplexer of the first sensor block is expanded to select the second set of touch sensors.

8. The method of claim 4, scanning the touch region further comprising:

while enabling the respective band multiplexer of the first sensor block, successively selecting the first set of touch sensors and the second set of touch sensors to output a respective capacitive sensing signal via an output port of the respective band multiplexer of the first sensor block.

9. The method of claim 1, wherein the touch region is symmetric with respect to a region center, and the touch location corresponds to a subset of one or more touch sensors overlapping the region center.

10. The method of claim 9, wherein the touch region includes a first number K1 of rows touch sensors and a second number K2 of columns of touch sensors, the first number K1 equal to the second number K2.

11. The method of claim 1, wherein:

each of the plurality of sensor blocks includes a plurality of sensor bands;

each sensor band includes a plurality of rows of touch sensors corresponding to a band height; and the capacitive sense array includes a first number of columns of touch sensors, and each row of the plurality of sensor blocks includes the first number of touch sensors.

12. The method of claim 11, wherein a height of the touch region is defined based on the band height.

13. The method of claim 11, wherein:

the first sensor block includes a first sensor band and a set of one or more remaining sensor bands;

a first capacitive sensor element of the first sensor band corresponds to a respective capacitive sensor element in each remaining sensor band; and the first capacitive sensor element and the respective capacitive sensor elements in the set of one or more remaining sensor bands are coupled to a first internal multiplexer, which is configured to select one of the first capacitive sensor element and the respective capacitive sensor elements to output an associated capacitive sensing signal.

14. An electronic device, comprising:

a capacitive sense array having a plurality of touch sensors, wherein the capacitive sense array includes a plurality of sensor blocks that further includes a first sensor block and a second sensor block immediately adjacent to the first sensor block; and a processing device coupled to the capacitive sense array, the processing device configured to:

obtain a plurality of capacitive sensing signals measured from the capacitive sense array, detect a touch event at a touch location in the first sensor block based on the plurality of capacitive sensing signals;

determine a touch region based on the touch location, the touch region including a first set of touch sensors in the first sensor block and a second set of touch sensors in the second sensor block; and scan the touch region including the first set of touch sensors in the first sensor block and the second set of touch sensors in the second sensor block, further including selecting the first set of touch sensors in the first sensor block and the second set of touch sensors in the second sensor block jointly via a set of internal multiplexers, wherein the set of internal multiplexer includes a first subset of internal multiplexers and a second subset of internal multiplexers, and the first set of touch sensors in the first sensor block and the second set of touch sensors in the second sensor block are selected via the first subset of internal multiplexers and the second subset of internal multiplexers, respectively.

15. The electronic device of claim 14, wherein the processing device is configured to:

in accordance with scanning the touch region, updating a subset of the plurality of capacitive sensing signals and the touch location of the touch event.

16. The electronic device of claim 14, wherein:

each of the plurality of sensor blocks includes a plurality of sensor bands;

each sensor band includes a plurality of rows of touch sensors corresponding to a band height; and the capacitive sense array includes a first number of columns of touch sensors, and each row of the plurality of sensor blocks includes the first number of touch sensors.

17. The electronic device of claim 14, wherein the touch region includes a number (K) of rows of capacitive sensor elements, and the touch location is on an M-th row, where M is equal to K/2, when K is an even integer, or (K+1)/2, when K is an odd integer.

18. An electronic device, comprising:

a controller; and memory storing instructions to be executed by the controller to:

obtain a plurality of capacitive sensing signals measured from a capacitive sense array having a plurality of touch sensors, wherein the capacitive sense array includes a plurality of sensor blocks that further includes a first sensor block and a second sensor block immediately adjacent to the first sensor block;

detect a touch event at a touch location in the first sensor block based on the plurality of capacitive sensing signals;

determine a touch region based on the touch location, the touch region including a first set of touch sensors in the first sensor block and a second set of touch sensors in the second sensor block; and scan the touch region including the first set of touch sensors in the first sensor block and the second set of touch sensors in the second sensor block, further including selecting the first set of touch sensors in the first sensor block and the second set of touch sensors in the second sensor block jointly via a set of internal multiplexers, wherein the set of internal multiplexer includes a first subset of internal multiplexers and a second subset of internal multiplexers, and the first set of touch sensors in the first sensor block and the second set of touch sensors in the second sensor block are selected via the first subset of internal multiplexers and the second subset of internal multiplexers, respectively.

19. The electronic device of claim 18, wherein each of the plurality of sensor blocks includes a first number of rows of touch sensors.

20. The electronic device of claim 18, wherein the touch region includes a number (K) of rows of capacitive sensor elements, and the touch location is on an M-th row, where M is equal to K/2, when K is an even integer, or (K+1)/2, when K is an odd integer.

* * * * *